(12) United States Patent
Furukawa

(10) Patent No.: US 9,204,012 B2
(45) Date of Patent: Dec. 1, 2015

(54) IMAGE FORMING APPARATUS WITH DENSITY DATA CORRECTION

(75) Inventor: Hitoshi Furukawa, Suntou-gun (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 686 days.

(21) Appl. No.: 13/070,654

(22) Filed: Mar. 24, 2011

(65) Prior Publication Data

US 2011/0242551 A1  Oct. 6, 2011

(30) Foreign Application Priority Data

Mar. 31, 2010  (JP) .................................. 2010-083397
Feb. 9, 2011  (JP) .................................. 2011-026533

(51) Int. Cl.
G06K 15/02  (2006.01)
H04N 1/60  (2006.01)

(52) U.S. Cl.
CPC ............... *H04N 1/60* (2013.01); *H04N 1/6033* (2013.01); *H04N 1/6041* (2013.01)

(58) Field of Classification Search
CPC ...... H04N 1/60; H04N 1/6033; H04N 1/6041
USPC ....................................................... 358/1.2
See application file for complete search history.

(56) References Cited

U.S. PATENT DOCUMENTS

| 8,565,627 | B2 | 10/2013 | Kinukawa et al. |
| 2004/0061882 | A1* | 4/2004 | Yamakawa ..................... 358/1.9 |
| 2009/0296147 | A1 | 12/2009 | Kinukawa et al. |
| 2009/0297191 | A1* | 12/2009 | Hirai et al. ....................... 399/49 |
| 2009/0324267 | A1* | 12/2009 | Yoshida et al. .................. 399/49 |

FOREIGN PATENT DOCUMENTS

| JP | 10-288880 A | 10/1998 |
| JP | 2005-148299 A | 6/2005 |
| JP | 2006-030793 A | 2/2006 |
| JP | 2010-009018 A | 1/2010 |

OTHER PUBLICATIONS

Japanese Office Action dated Dec. 1, 2014, in related Japanese Patent Applicaiton No. 2011-026533.

* cited by examiner

*Primary Examiner* — Marivelisse Santiago Cordero
*Assistant Examiner* — Kevin Ky
(74) *Attorney, Agent, or Firm* — Fitzpatrick, Cella, Harper & Scinto

(57) ABSTRACT

An image forming apparatus that reduces the downtime due to image density control is provided. To accomplish this, the image forming apparatus obtains, using a sensor, background data at a plurality of measurement positions from a rotation member, and density data at a plurality of measurement positions from a patch image formed on the rotation member. Further, the image forming apparatus normalizes density data based on first background data and calculates first correction density data, and also normalizes density data based on second background data for which the measurement positions have been shifted from those of the first background data, calculates second correction density data, and acquires corrected density data in accordance with the first correction density data or the second correction density data that has a smaller variation.

14 Claims, 26 Drawing Sheets

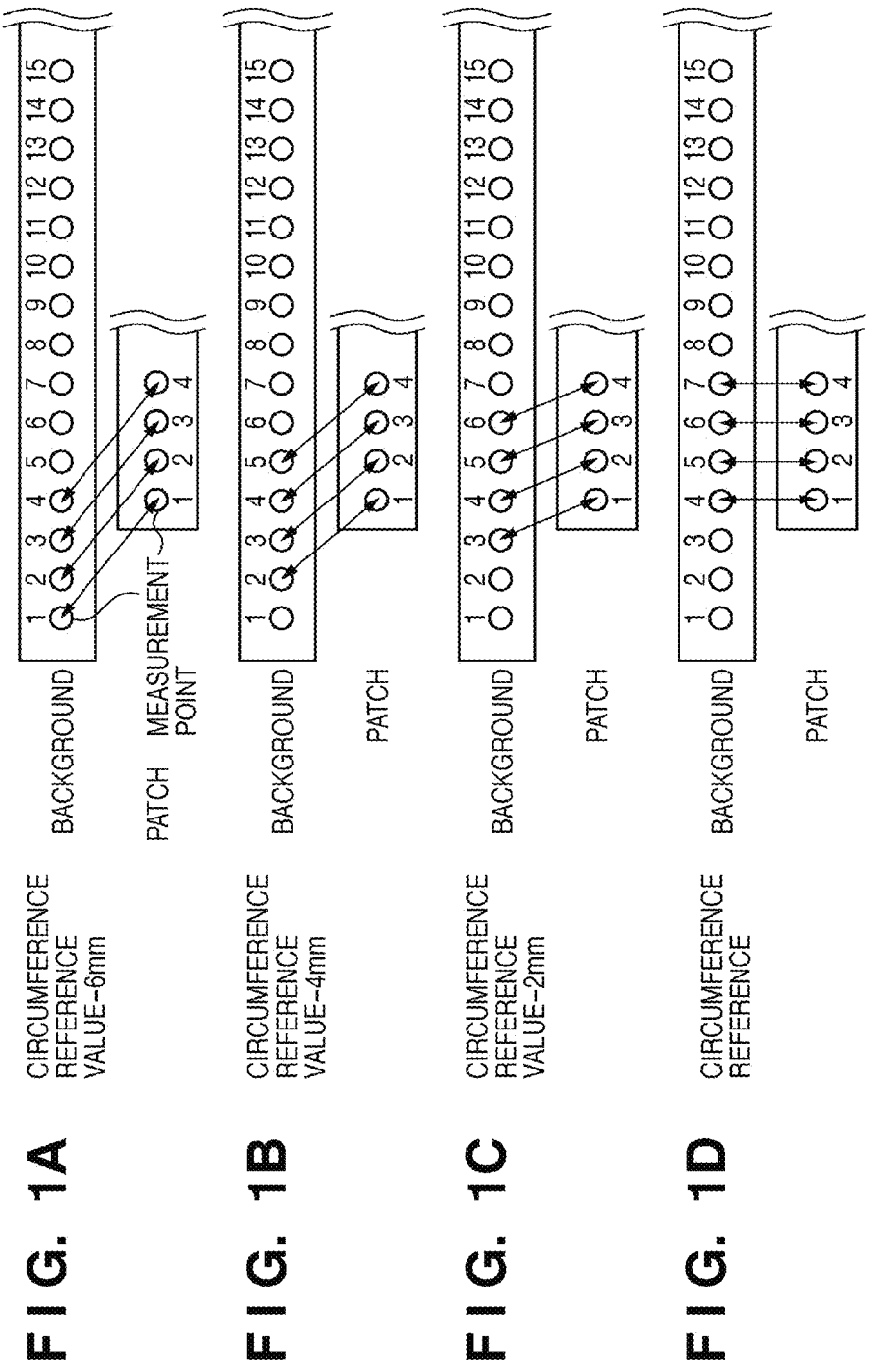

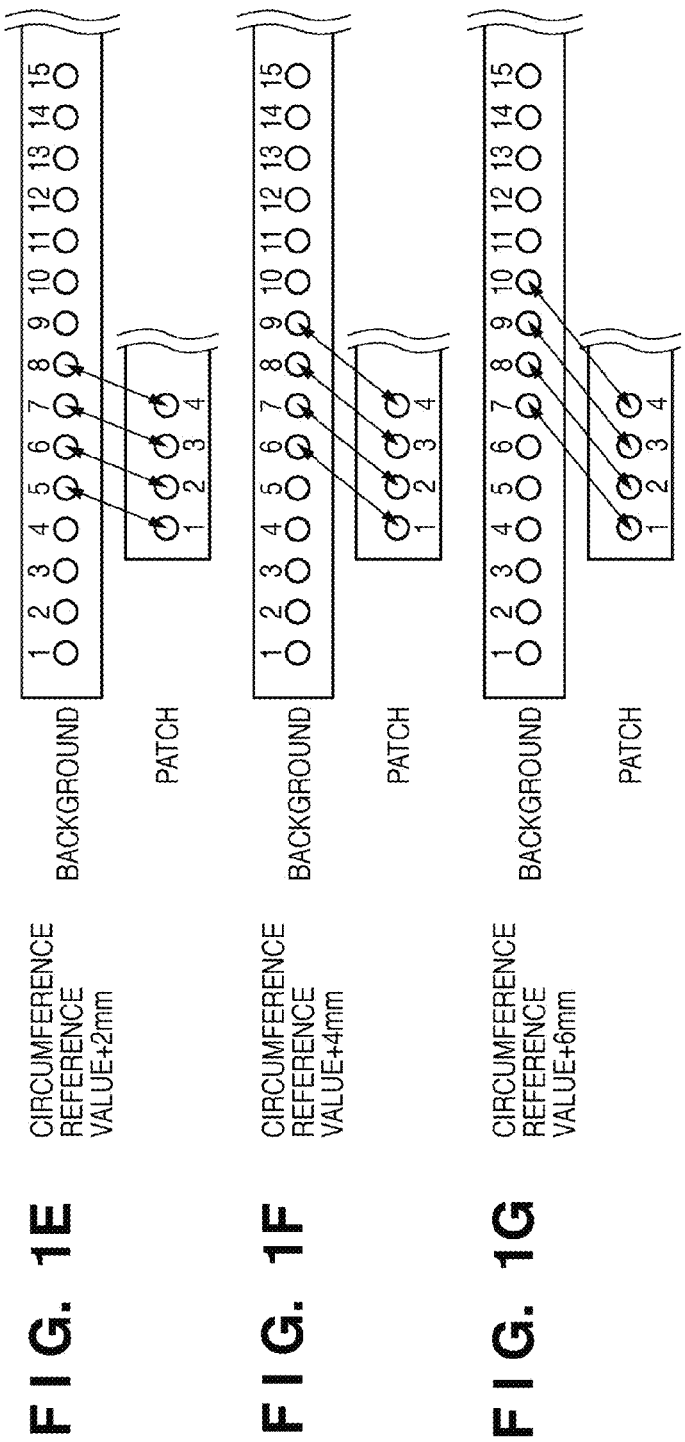

FIG. 9

| PATCH MEASUREMENT POINT | A | B | C | D | E | F | G |
|---|---|---|---|---|---|---|---|
| 1 | 0 | 1 | 0 | 0 | 0 | 2 | 0 |
| 2 | 0 | 1 | 0 | 4 | 1 | 2 | 0 |
| 3 | 3 | 7 | 4 | 5 | 1 | 0 | 0 |
| 4 | 10 | 10 | 8 | 3 | 7 | 9 | 14 |
| 5 | 5 | 0 | 4 | 7 | 11 | 12 | 8 |
| 6 | 0 | 0 | 6 | 6 | 1 | 2 | 0 |
| 7 | 10 | 10 | 6 | 7 | 5 | 4 | 12 |
| 8 | 11 | 12 | 10 | 9 | 19 | 16 | 20 |
| 9 | 8 | 8 | 16 | 13 | 18 | 15 | 14 |
| 10 | 15 | 13 | 17 | 15 | 14 | 8 | 3 |
| 11 | 21 | 18 | 17 | 11 | 7 | 9 | 13 |
| 12 | 23 | 17 | 13 | 14 | 19 | 17 | 18 |
| 13 | 10 | 12 | 17 | 14 | 15 | 19 | 16 |
| 14 | 16 | 14 | 15 | 18 | 16 | 15 | 18 |
| 15 | 18 | 21 | 19 | 18 | 21 | 21 | 24 |
| 16 | 16 | 15 | 19 | 18 | 22 | 22 | 18 |
| 17 | 17 | 17 | 21 | 21 | 17 | 15 | 14 |
| 18 | 28 | 28 | 25 | 23 | 22 | 19 | 17 |
| 19 | 29 | 29 | 28 | 24 | 23 | 22 | 24 |
| 20 | 31 | 29 | 27 | 26 | 28 | 26 | 27 |
| 21 | 26 | 26 | 28 | 25 | 26 | 33 | 39 |
| 22 | 24 | 24 | 24 | 30 | 36 | 38 | 38 |
| 23 | 18 | 25 | 31 | 32 | 32 | 28 | 28 |
| 24 | 31 | 34 | 34 | 29 | 29 | 24 | 24 |
| 25 | 42 | 39 | 39 | 34 | 32 | 36 | 39 |
| 26 | 37 | 33 | 32 | 35 | 37 | 38 | 37 |
| 27 | 29 | 34 | 36 | 36 | 35 | 27 | 27 |
| 28 | 42 | 43 | 42 | 34 | 33 | 30 | 36 |
| 29 | 47 | 40 | 40 | 35 | 41 | 48 | 43 |
| 30 | 29 | 27 | 33 | 39 | 34 | 34 | 34 |
| 31 | 39 | 47 | 42 | 41 | 41 | 44 | 43 |
| 32 | 40 | 40 | 40 | 42 | 41 | 45 | 42 |

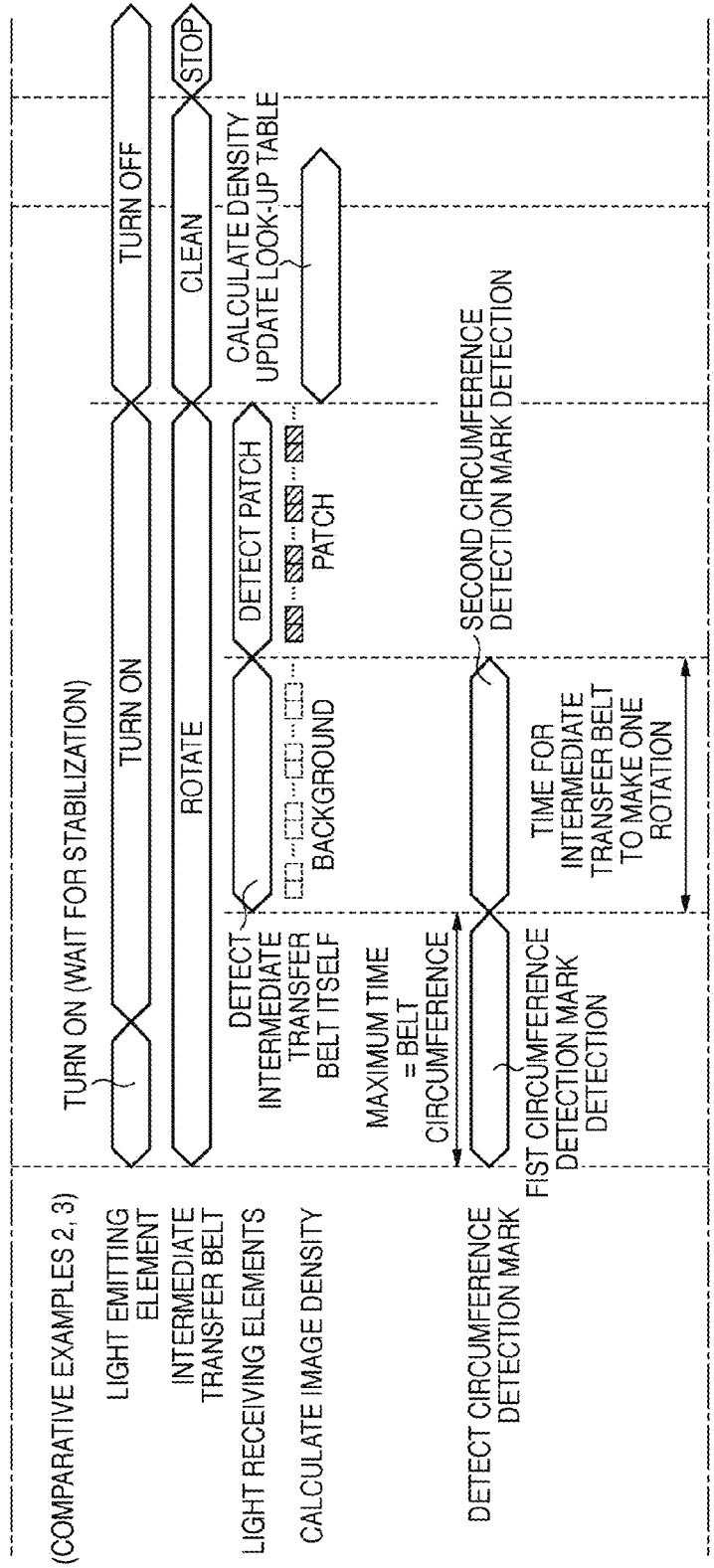

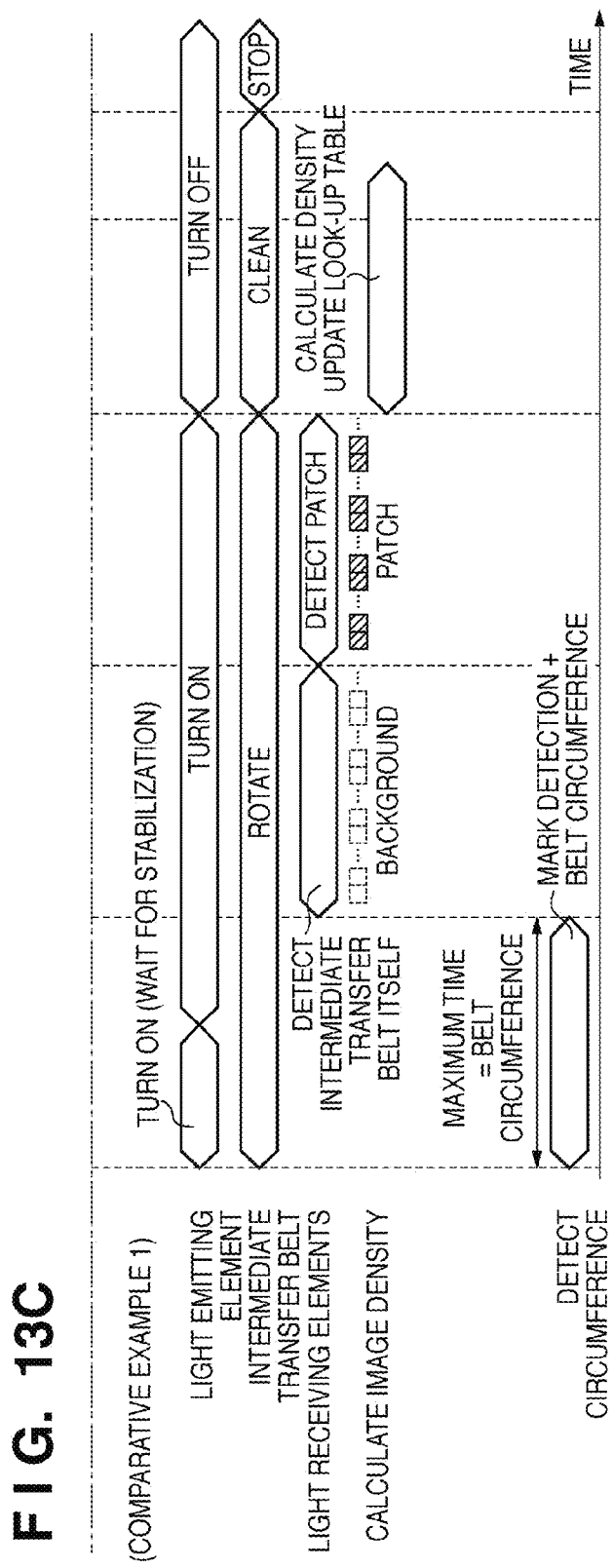

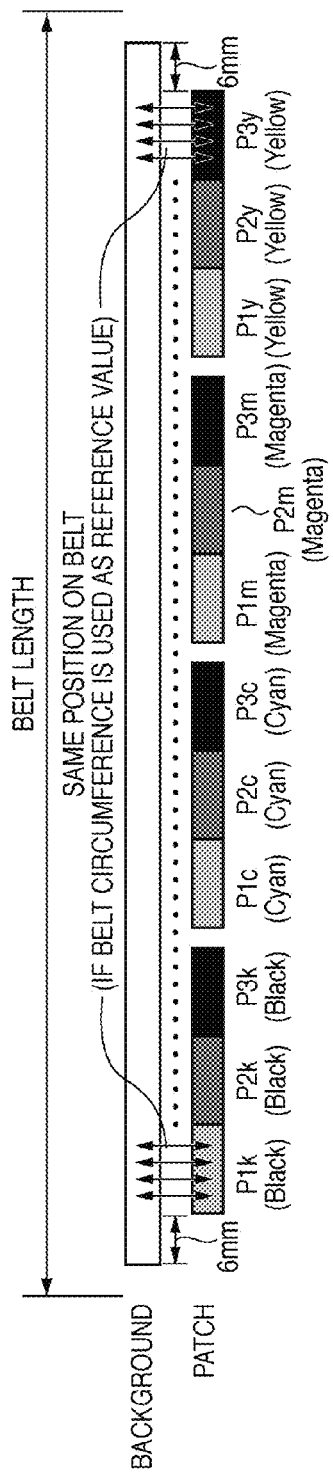
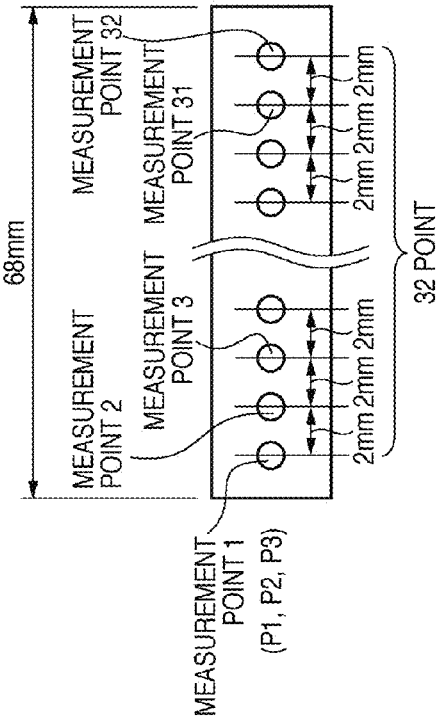
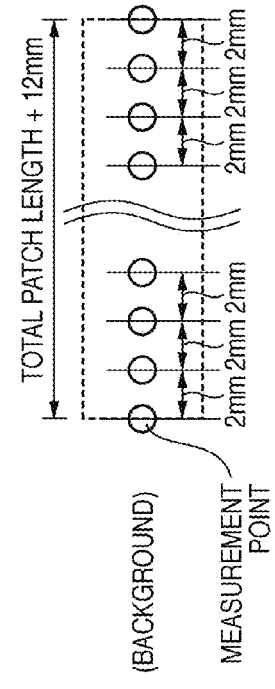
FIG. 14A
FIG. 14B
FIG. 14C

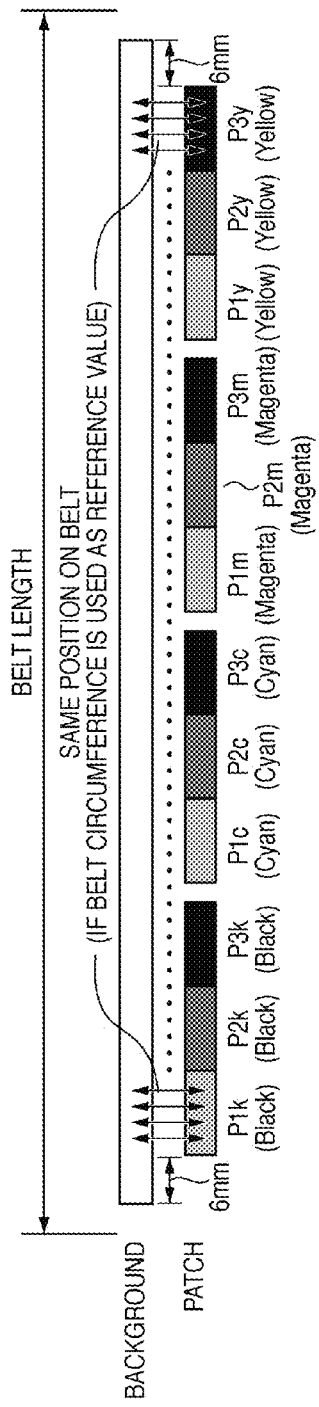
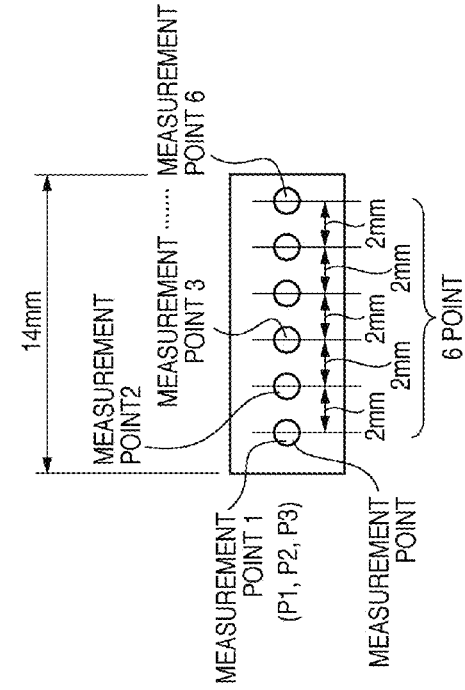
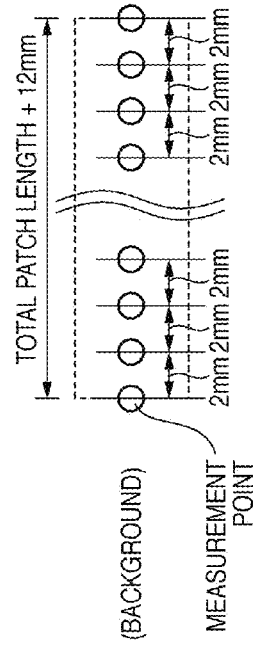
FIG. 17A
FIG. 17B
FIG. 17C

F I G. 18A

| SUM OF SQUARE OF DEVIATIONS (MAGNITUDE OF VARIATION) | A | B | C | D | E | F | G |
|---|---|---|---|---|---|---|---|
| n = 32 | 352 | 255 | 63 | 240 | 382 | 549 | 849 |
| n = 28 | 251 | 188 | 61 | 194 | 300 | 480 | 696 |
| n = 24 | 157 | 137 | 51 | 184 | 245 | 403 | 558 |
| n = 20 | 110 | 115 | 39 | 178 | 240 | 399 | 536 |
| n = 16 | 101 | 82 | 37 | 145 | 214 | 334 | 462 |
| n = 12 | 71 | 44 | 36 | 69 | 133 | 177 | 232 |
| n = 8 | 57 | 27 | 19 | 51 | 71 | 147 | 160 |

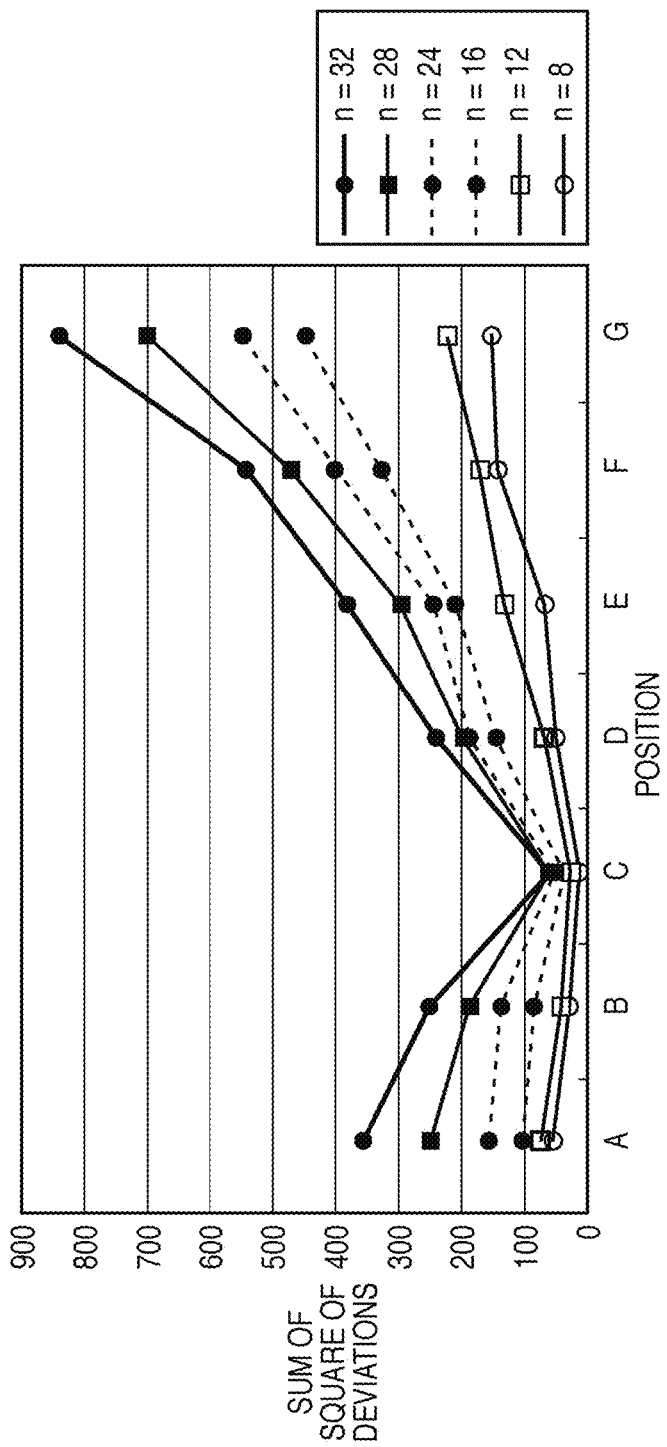

FIG. 19

| | MEASUREMENT POINT | A | B | C | D | E | F | G |
|---|---|---|---|---|---|---|---|---|
| P1 | 1 | 34 | 38 | 40 | 39 | 39 | 41 | 43 |
| | 2 | 42 | 42 | 42 | 42 | 46 | 49 | 43 |
| | 3 | 40 | 42 | 43 | 46 | 42 | 43 | 43 |
| | 4 | 41 | 43 | 40 | 41 | 40 | 41 | 42 |
| | 5 | 37 | 39 | 40 | 40 | 42 | 41 | 38 |
| | 6 | 40 | 39 | 42 | 41 | 39 | 38 | 34 |
| P2 | 1 | 66 | 69 | 72 | 72 | 73 | 72 | 70 |
| | 2 | 69 | 71 | 72 | 72 | 69 | 66 | 65 |
| | 3 | 72 | 72 | 72 | 68 | 69 | 64 | 61 |
| | 4 | 71 | 68 | 71 | 65 | 63 | 64 | 60 |
| | 5 | 73 | 69 | 68 | 69 | 66 | 68 | 64 |
| | 6 | 72 | 73 | 72 | 73 | 72 | 72 | 68 |
| P3 | 1 | 139 | 141 | 144 | 144 | 143 | 141 | 138 |
| | 2 | 145 | 145 | 145 | 144 | 142 | 143 | 143 |
| | 3 | 144 | 143 | 142 | 143 | 143 | 143 | 142 |
| | 4 | 140 | 140 | 142 | 142 | 141 | 143 | 142 |
| | 5 | 143 | 142 | 143 | 144 | 144 | 140 | 143 |
| | 6 | 143 | 142 | 143 | 144 | 144 | 140 | 143 |

FIG. 21A

|  | A | B | C | D | E | F | G |
|---|---|---|---|---|---|---|---|
| AVERAGE VALUE (P1) | 39 | 40 | 41 | 41 | 41 | 42 | 40 |
| AVERAGE VALUE (P2) | 70 | 70 | 71 | 69 | 68 | 67 | 64 |
| AVERAGE VALUE (P3) | 142 | 142 | 143 | 143 | 142 | 141 | 141 |
| SUM OF SQUARE OF DEVIATIONS (P1) | 44 | 23 | 9 | 31 | 36 | 69 | 71 |
| SUM OF SQUARE OF DEVIATIONS (P2) | 35 | 20 | 13 | 51 | 72 | 70 | 78 |
| SUM OF SQUARE OF DEVIATIONS (P3) | 28 | 15 | 7 | 5 | 11 | 14 | 23 |
| SUM OF SQUARE OF DEVIATIONS (P1 + P2 + P3) | 107 | 58 | 29 | 87 | 119 | 153 | 172 |

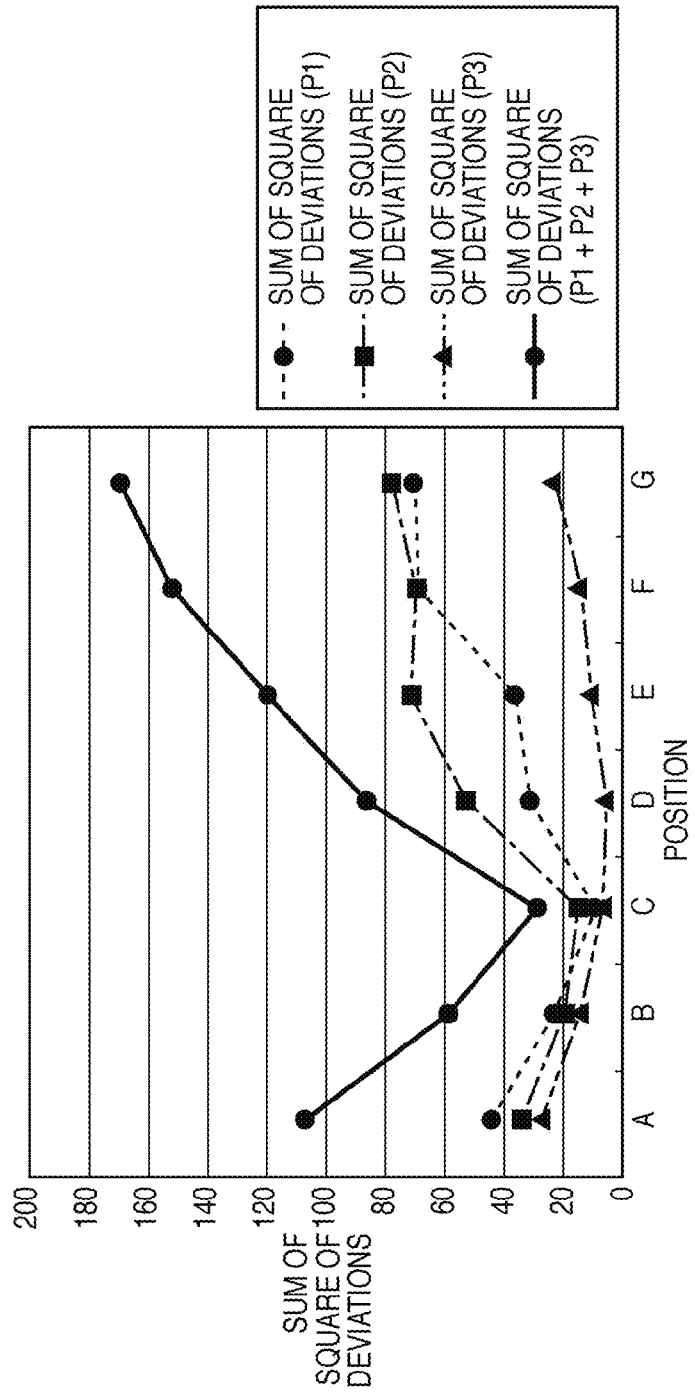

IMAGE FORMING APPARATUS WITH DENSITY DATA CORRECTION

BACKGROUND OF THE INVENTION

1. Field of the Invention

The present invention relates to an image forming apparatus.

2. Description of the Related Art

In recent years, it is common for color image forming apparatuses to have a function of automatically controlling image density, since there is a demand for accurate color reproducibility and tone stability. In image density control, generally, a plurality of test toner images (patches) that have been formed on an image carrier (rotation member) while changing image creation conditions are detected using an image density detector arranged in the image forming apparatus, and an optimal image creation condition is determined based on the conversion results.

At this time, with regard to toner image detection, the reflectance on the surface of the image carrier is different depending on the position on the image carrier. Therefore, in order to accurately detect density, it is necessary to obtain output indicating toner presence/absence at the same position on the image carrier, and normalize the output indicating toner presence by the output indicating toner absence. On the other hand, the circumference of the image carrier changes due to variation in components, atmosphere/environment of the image forming apparatus, and the like, and errors will occur in specifying positions on the image carrier if the circumference is treated as a fixed value. In view of this, it is necessary to dynamically measure information with regard to the circumference of the image carrier.

Japanese Patent Laid-Open No. 10-288880 proposes a method for measuring the circumference of an image carrier in an image forming apparatus that adopts an intermediate transfer method by attaching a mark to the surface of an edge portion of an intermediate transfer member (rotation member), and receiving reflected light from the mark using an optical sensor.

However, the conventional technology has problems described below. For example, in the image forming apparatus that adopts an intermediate transfer method disclosed in Japanese Patent Laid-Open No. 10-288880, the intermediate transfer member needs to be rotated to the position at which the mark is set and further rotated one full rotation from that position. Specifically, this is because the mark may not necessarily be positioned very close to the optical sensor when circumference measurement is started. In a worst-case scenario, the intermediate transfer member may need to be rotated approximately two full rotations before the circumference can be detected. In image density control, if time is spent on circumference measurement, a period (so-called downtime) in which image formation cannot be executed also increases, which impairs usability.

SUMMARY OF THE INVENTION

The present invention enables realization of an image forming apparatus that reduces downtime due to image density control.

One aspect of the present invention provides an image forming apparatus comprising: a rotation member that is used for image formation; a detection unit that irradiates a detection target with light and detects reflected light from the detection target; a first obtaining unit that obtains, with the detection target being the rotation member, background data at a plurality of measurement positions on the rotation member based on the detection by the detection unit; a second obtaining unit that obtains, with a toner image for adjusting an image density of an image formed on the rotation member being the detection target, density data of the toner image at the plurality of measurement positions based on the detection by the detection unit; a calculating unit that, based on first background data of a plurality of measurement positions in an obtaining result by the first obtaining unit, normalizes the density data, and calculates first correction density data, and normalizes the density data at the plurality of measurement positions based on second background data of a plurality of measurement positions in the obtaining result that have been shifted from the measurement positions of the first background data, and calculates second correction density data; and a determination unit that determines whether the first correction density data or the second correction density data has a smaller variation between a plurality of density values respectively included therein, wherein corrected density data is obtained in accordance with the determination by the determination unit.

Another aspect of the present invention provides an image forming apparatus that includes a rotation member used for image formation, forms a toner image on the rotation member, corrects a density of the toner image in accordance with background data of the rotation member, and obtains corrected density data, the image forming apparatus comprising: a detection unit that irradiates a detection target with light and detects reflected light from the detection target; a first obtaining unit that obtains, with the detection target being the rotation member, background data at a plurality of measurement positions on the rotation member based on the detection; a second obtaining unit that obtains, with a toner image for adjusting an image density of an image formed on the rotation member being the detection target, density data of the toner image at the plurality of measurement positions based on the detection; and a calculating unit that calculates a first correlation value that indicates a correlation between the density data and first background data of a plurality of measurement positions in an obtaining result by the first obtaining unit, and calculates a second correlation value that indicates a correlation between the density data and second background data of a plurality of measurement positions in the obtaining result that have been shifted from the measurement positions of the first background data, wherein there are a plurality of the toner image, each having a mutually different color or density, the calculating unit calculates the first correlation value and the second correlation value with respect to each of the plurality of toner images, totals the respective first correlation values of the plurality of toner images, and totals the respective second correlation values of the plurality of toner images, the image forming apparatus further comprises a determination unit that determines which of the total value of the first correlation values and the total value of the second correlation values has a higher correlation, and corrected density data is obtained in accordance with the first or second background data that is determined as having a higher correlation by the determination unit.

Further features of the present invention will be apparent from the following description of exemplary embodiments with reference to the attached drawings.

BRIEF DESCRIPTION OF THE DRAWINGS

FIGS. 1A to 1G are diagrams showing calculation positions of measurement points of a patch image and measurement points of a background.

FIG. 9 is a diagram showing densities calculated based on background data pieces.

FIGS. 13A to 13C are a diagram showing a comparison of an image density control time between the present image density control and a comparative control example.

FIG. 14A is a diagram showing the background and a general view of patch images.

FIG. 14B is a diagram showing the measurement points of the background.

FIG. 14C is a diagram showing the measurement points of the patch images.

FIG. 17A is a diagram showing the background and a general view of patch images.

FIG. 17B is a diagram showing the measurement points of the background.

FIG. 17C is a diagram showing the measurement points of the patch images.

FIGS. 18A and 18B are diagrams showing results of calculations of the level of the calculated degree of variation in densities.

FIG. 19 is a diagram showing densities calculated based on background data pieces.

FIGS. 21A and 21B are diagrams showing results of calculations of the level of the calculated degree of variation in densities.

DESCRIPTION OF THE EMBODIMENTS

Embodiments of the present invention will now be described in detail with reference to the drawings. It should be noted that the relative arrangement of the components, the numerical expressions and numerical values set forth in these embodiments do not limit the scope of the present invention unless it is specifically stated otherwise.

First Embodiment

First, a first embodiment is described with reference to FIGS. 1A to 13. The present embodiment is an example in which the present invention is applied to a color image forming apparatus. Note that the present invention is also applicable to a monochrome image forming apparatus. Examples of an image forming apparatus include a printing apparatus, a printer, a copy machine, a multifunction peripheral, and a facsimile machine. A recording material may be referred to as a transfer material, a recording medium, paper, a sheet, or transfer paper, for example.

Configuration of Image Forming Apparatus

Figure 2:
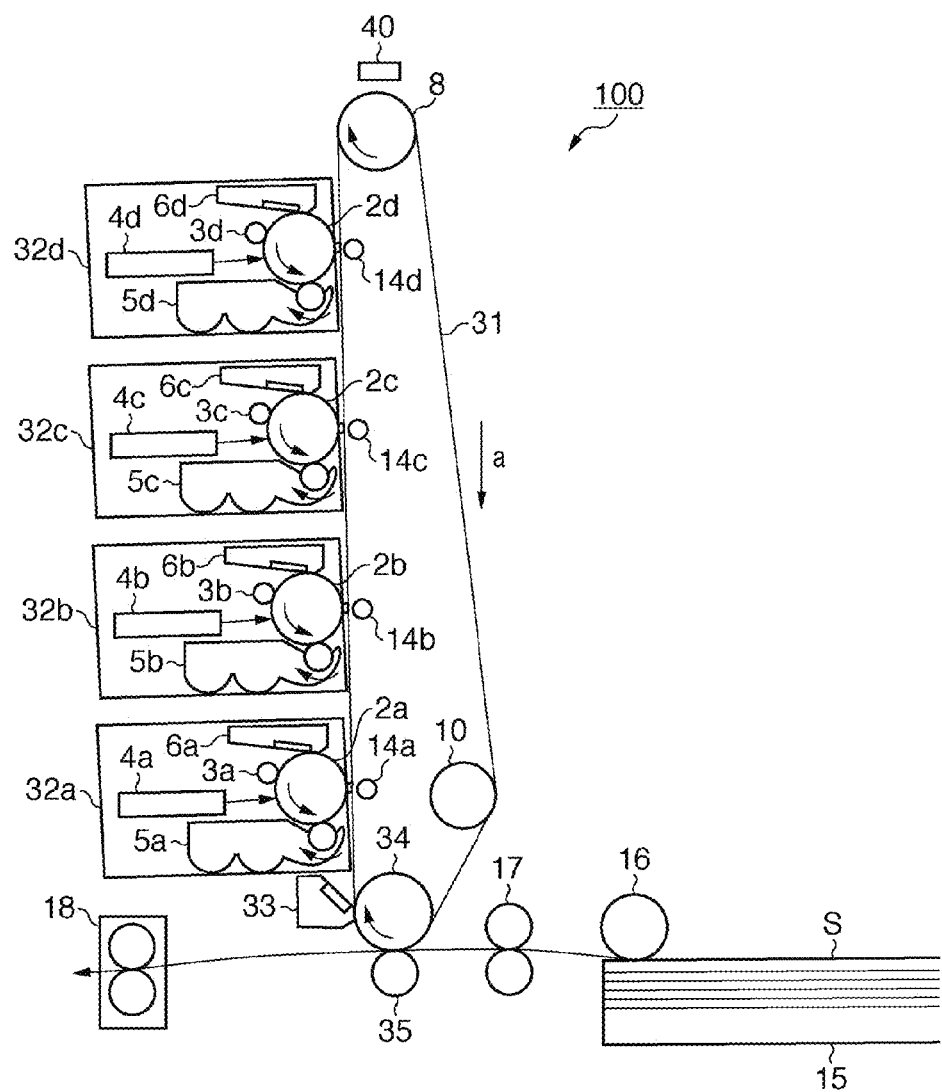
FIG. 2 is a diagram showing an example of a schematic cross-section of an image forming apparatus 100.

First, the configuration of an image forming apparatus 100 according to the present embodiment is described with reference to FIG. 2. Here, four image forming stations respectively corresponding to Y (yellow), M (magenta), C (cyan), and Bk (black) toner are provided. To facilitate a description, the image forming stations have a common configuration except the color of the developer (toner).

Process cartridges 32 are each provided with a photosensitive drum 2, a charging device 3, an exposing device 4, a developing device 5, and a cleaning blade 6. Toner images each having a different color that have been formed by these process cartridges (image forming stations) 32 sequentially undergo primary transfer onto an intermediate transfer belt 31 by primary transfer rollers 14. The multi-colored image formed on the intermediate transfer belt 31 undergoes secondary transfer onto a recording material S by a secondary transfer roller 35. The recording material S is conveyed from a paper feed unit 15. After that, a fixing device 18 fixes the multi-colored image onto the recording material S. Note that toner remaining on the intermediate transfer belt 31 is collected by a cleaning blade 33. Note that in the following description, the intermediate transfer belt 31 is taken as an example of a rotation member used for image formation. However, the present invention is not limited to this, and a recording material carrier serving as an image carrier may be applied as a rotation member.

The photosensitive drums 2 are rotating drum type electrophotographic photosensitive members that are used repeatedly, and are driven rotationally at a predetermined circumferential speed (process speed). The process speed is 180 mm/sec, for example. Charging processing is uniformly performed on the photosensitive drums 2 so as to have a predetermined polarity/potential by primary charging rollers of the primary charging devices 3. The exposing devices 4 are each provided with, for example, a laser diode, a polygon scanner, a lens group, and the like, and expose images on the photosensitive drums 2. Electrostatic latent images are thereby formed on the photosensitive drums 2. Next, the developing devices 5 perform developing processing for causing toner to adhere to the electrostatic latent images formed on the image carriers. Developing rollers of the developing devices 5 are disposed so as to be in contact with the photosensitive drums 2 while rotating in a forward direction with respect to the photosensitive drums 2.

The intermediate transfer belt 31 is rotationally driven due to the operation of a driving roller 8 at substantially the same circumferential speed as that of the photosensitive drums 2, while being in contact with the photosensitive drums 2. The image formation surface (hereinafter, referred to as the surface) used for image formation of the intermediate transfer belt 31 is, for example, black and has a comparatively high reflectance. The intermediate transfer belt 31 expands and contracts due to the tolerance when the belt is manufactured (about ±1.0 mm relative to an ideal size value) and fluctuation in the temperature/humidity of a use environment. However, the intermediate transfer belt 31 can rotate normally even if the circumference thereof changes since the intermediate transfer belt is tensioned by a tension roller 10.

The primary transfer rollers 14 are solid rubber rollers having resistance that has been adjusted to be 10E7 to 10E9Ω, for example. Note that the residual toner that remains on the photosensitive drums 2 after primary transfer is removed and collected by the cleaning blades 6. The recording material S that has been fed from the paper feed unit 15 is supplied toward a nip portion between the intermediate transfer belt 31 and the secondary transfer roller 35 at a predetermined timing by a pair of registration rollers 17 that are rotationally driven. Subsequently, the toner image on the intermediate transfer belt 31 is transferred onto the recording material S by the action of static electricity due to a high voltage applied to the secondary transfer roller 35. An optical detection sensor 40 detects the toner image (image, adjustment patch, and the like) formed on the intermediate transfer belt 31, and the detected toner image is used to measure the amount of adhered toner. Details of the optical detection sensor 40 are later described with reference to FIGS. 3 and 4.

Control Configuration of Image Forming Apparatus

Figure 3:
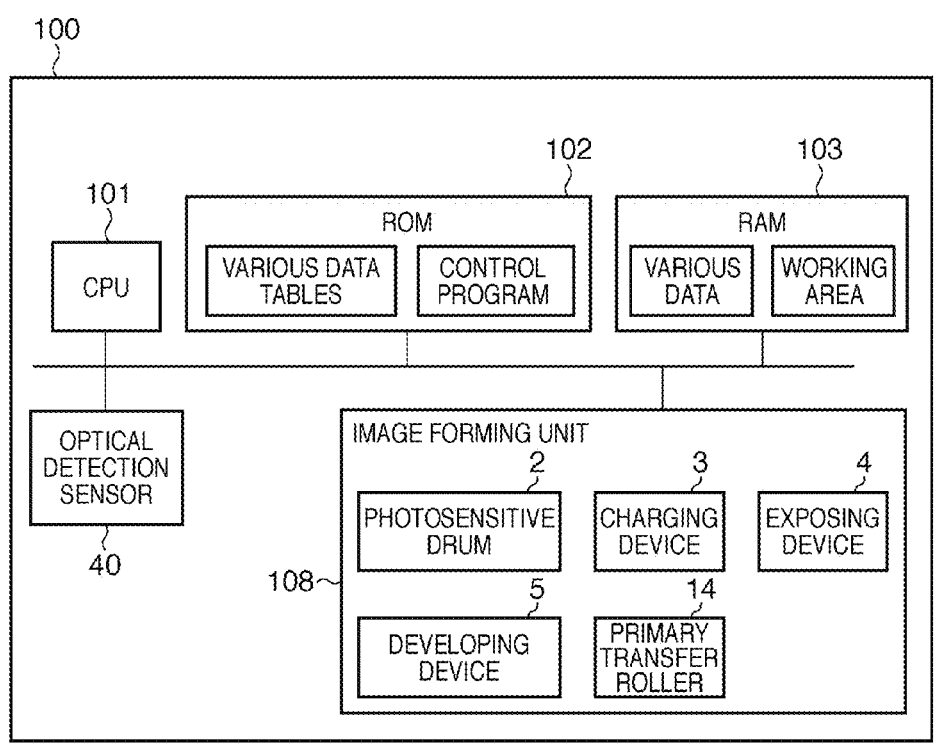
FIG. 3 is a block diagram showing an example of a control configuration of the image forming apparatus.

Next, the configuration of a control unit of the image forming apparatus 100 is described with reference to FIG. 3. The image forming apparatus 100 is provided with a CPU 101, a ROM 102, a RAM 103, the optical detection sensor 40, and an image forming unit 108 as a control configuration. Based on various control programs stored in the ROM 102, the CPU 101 uses the RAM 103 as a working area and controls units of the image forming apparatus 100. Specifically, the CPU 101 performs an image formation operation, image density control to stabilize tones by reducing tone fluctuation of an image caused by a change in the use environment described below, and the like. Here, a change in the use environment indicates a change in humidity, temperature, and the use condition of consumables, for example. Various control programs, various data, and tables are stored in the ROM 102. A working area of the CPU 101, a storage region of various data, and the like are provided in the RAM 103. The optical detection sensor 40 detects a toner image (image, adjustment patch, and the like) formed on the intermediate transfer belt 31, and the detected toner image is used to measure the amount of adhered toner. The image forming unit 108 includes the photosensitive drums 2, the charging devices 3, the exposing devices 4, the developing devices 5, the primary transfer rollers 14, and the like, which have been described above.

In the present embodiment, an example is described in which the CPU 101 executes circumference measurement and density control. However, the present invention is not limited to this, and for example, if an application-specific integrated circuit (ASIC) and an SOC (System On Chip) are implemented in the image forming apparatus, these may be caused to execute a part or all of circumference measurement and density control processing. Here, SOC indicates a chip in which a CPU and an ASIC are integrated and provided in the same package. In this way, if circumference measurement and density control are executed by an ASIC, the processing load on the CPU 101 can be reduced.

Optical Detection Sensor

Next, the optical detection sensor 40 that functions as a detection unit is described with reference to FIG. 4. The optical detection sensor 40 is provided with a light emitting element 40a such as an LED, two light receiving elements 40b and 40c such as photodiodes, and a holder. The light emitting element 40a irradiates patches on the intermediate transfer belt 31 and the background with infrared light (wavelength of 950 nm), for example. The light receiving elements 40b and 40c measure the amount of reflected light therefrom. A density control unit of the CPU 101 calculates toner amount data related to the amount of adhered toner and data indicating the shift amount of toner position, based on the amount of reflected light obtained by the optical detection sensor 40.

Reflected light from patches and the background includes a specular reflection component and a diffuse reflection component. The light receiving element 40b detects both the specular reflection component and the diffuse reflection component, whereas the light receiving element 40c detects only the diffuse reflection component. When toner adheres to the intermediate transfer belt 31, light is blocked by the toner, and thus specular reflection light decreases, or in other words, the output of the light receiving element 40b decreases.

On the other hand, the 950 nm infrared light used in the present embodiment is absorbed by black toner, and diffusely reflected by yellow, magenta, and cyan toner. Therefore, if the amount of adhered toner on the intermediate transfer belt 31 increases, the output of the light receiving element 40c increases with regard to yellow, magenta, and cyan. Note that the light receiving element 40b is also influenced by an increase in the amount of adhered toner. Specifically, with regard to yellow, magenta, and cyan, even if light to the intermediate transfer belt 31 is completely blocked by toner, the output of the light receiving element 40b will not be zero.

Although the above is a typical description of the optical detection sensor 40, it will be apparent to those skilled in the art that sensors, other than the above sensor, using various methods that are already known, such as a sensor using infrared rays for irradiation light, are applicable as the optical detection sensor 40.

Necessity for Image Density Control

In the image forming apparatus 100, the optical detection sensor 40 serving as an optical detecting unit is disposed at a portion opposing to the intermediate transfer belt 31. Generally, in an electrophotographic color image forming apparatus, electrical characteristics of units and recording materials and adhesion with respect to toner change due to various conditions such as replacement of consumables, environmental changes (temperature, humidity, equipment degradation, or the like), and the number of sheets to be printed. A change in characteristics manifests as a fluctuation in image density or a change in color reproducibility. Thus, this fluctuation prevents the original correct color reproducibility from being obtained.

In view of this, in the present embodiment, to always obtain accurate color reproducibility, a plurality of patches (toner images) are experimentally formed in a non-image-forming state while changing image creation conditions, and the densities thereof are detected by the optical detection sensor 40. Note that the non-image-forming state here indicates a state where image formation of normal documents that have been created by a user or the like is not performed. Then, the density control unit executes image density control based on the detection results. Examples of a factor that influences image density include a charging bias, a development bias, exposure intensity, a look-up table, and the like. In the present embodiment, an example in which image formation conditions are adjusted by correcting a look-up table is described. Specific operation in image density control is described later.

Necessity for Measurement of Amount of Reflected Light from Patch Formation Portions on Surface of Intermediate Transfer Belt with Respect to Patch Measurement Locations Next, a fluctuation in background output and a fluctuation in patch output at a plurality of positions on the intermediate transfer belt 31 are described with reference to FIG. 5. The patches are toner images formed so as to have the same halftone density. Background output indicates a light amount of reflected light detected by the light receiving element 40b when patches are not formed on the intermediate transfer belt. Further, patch output indicates a light amount of reflected light detected by the light receiving element 40b with respect to the patches formed on the intermediate transfer belt. As shown in FIG. 4, output of the light receiving element 40b is influenced by the surface reflectance of the intermediate transfer belt 31 serving as an image carrier (rotation member) in the present embodiment. Accordingly, even though patches have been formed so as to have the same density, the values of patch output are different. The same also applies to the case of the light receiving element 40c.

If image density control is executed under the influence of the reflectance of the background of the intermediate transfer belt 31, a correlation between density data of a printed halftone and the output of the light receiving elements 40b and 40c decreases. Therefore, the accuracy of image density control will deteriorate. In order to cancel the influence of the reflectance of the surface of the intermediate transfer belt 31, it is necessary to measure reflected light received by the light receiving elements 40b and 40c corresponding to toner presence/absence at the same position on the intermediate transfer belt 31. A calculation method for canceling the influence of the reflectance of the surface (background) of the intermediate transfer belt 31 will be described later.

On the other hand, the circumference of the intermediate transfer belt 31 changes due to the manufacturing tolerance, environment, and paper feeding durability (extended operation of the apparatus). In such a case, it is necessary to measure, at the same position, reflected light received by the light receiving elements 40b and 40c corresponding to toner presence/absence in accordance with a change in the circumference.

Image Density Control

Figure 6:
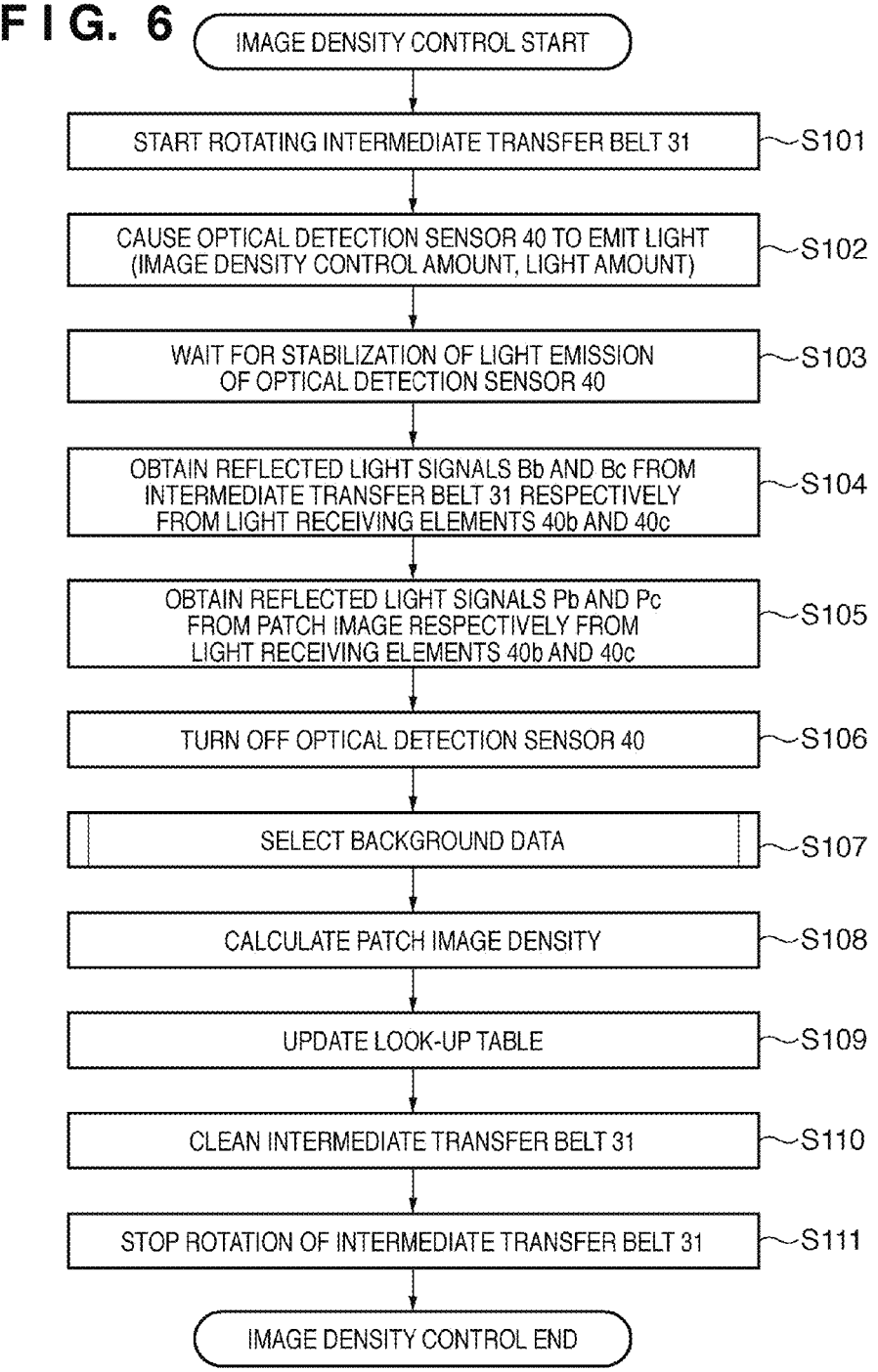
FIG. 6 is a flowchart showing a control procedure of image density control.
Figure 7:
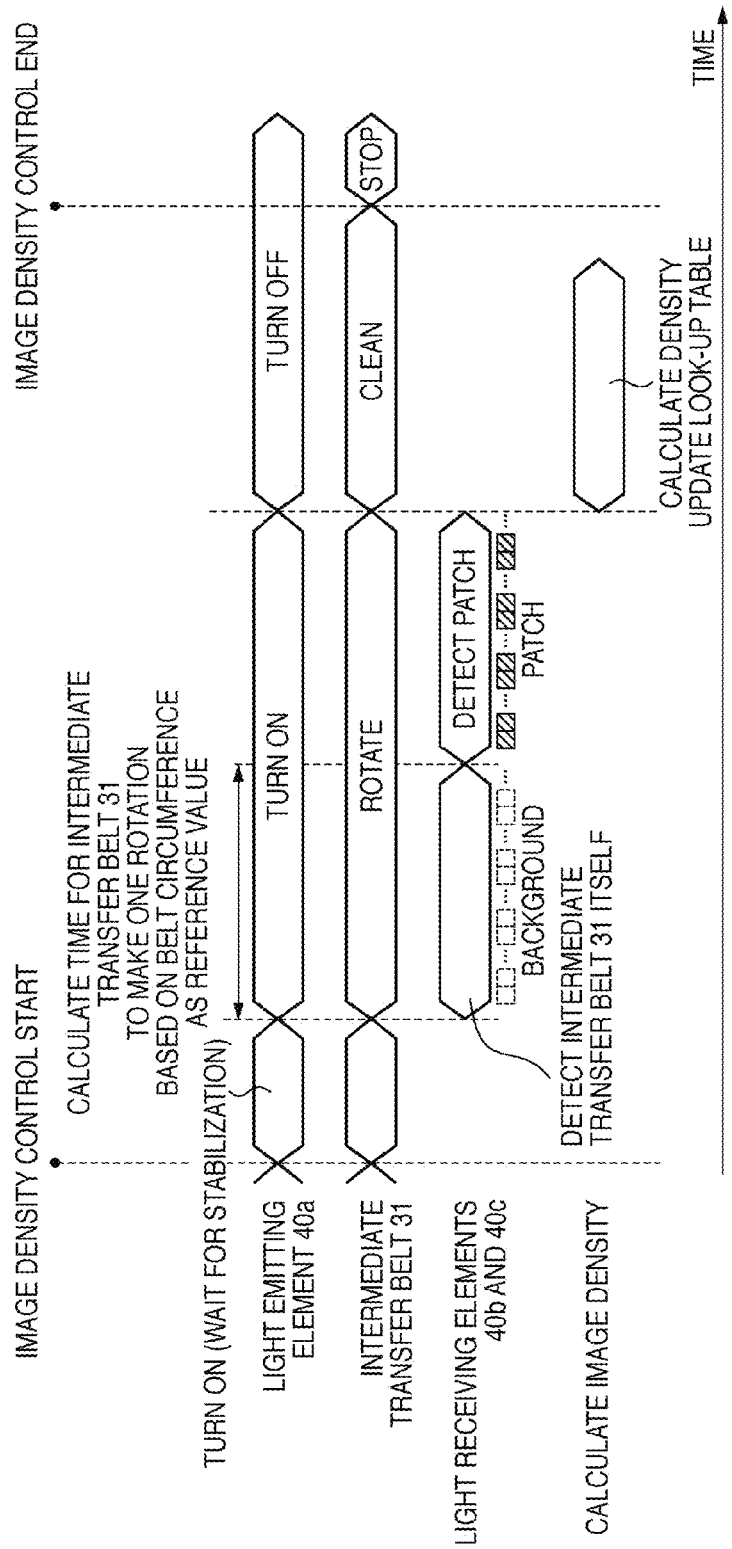
FIG. 7 is a timing chart of image density control.
Figure 8:
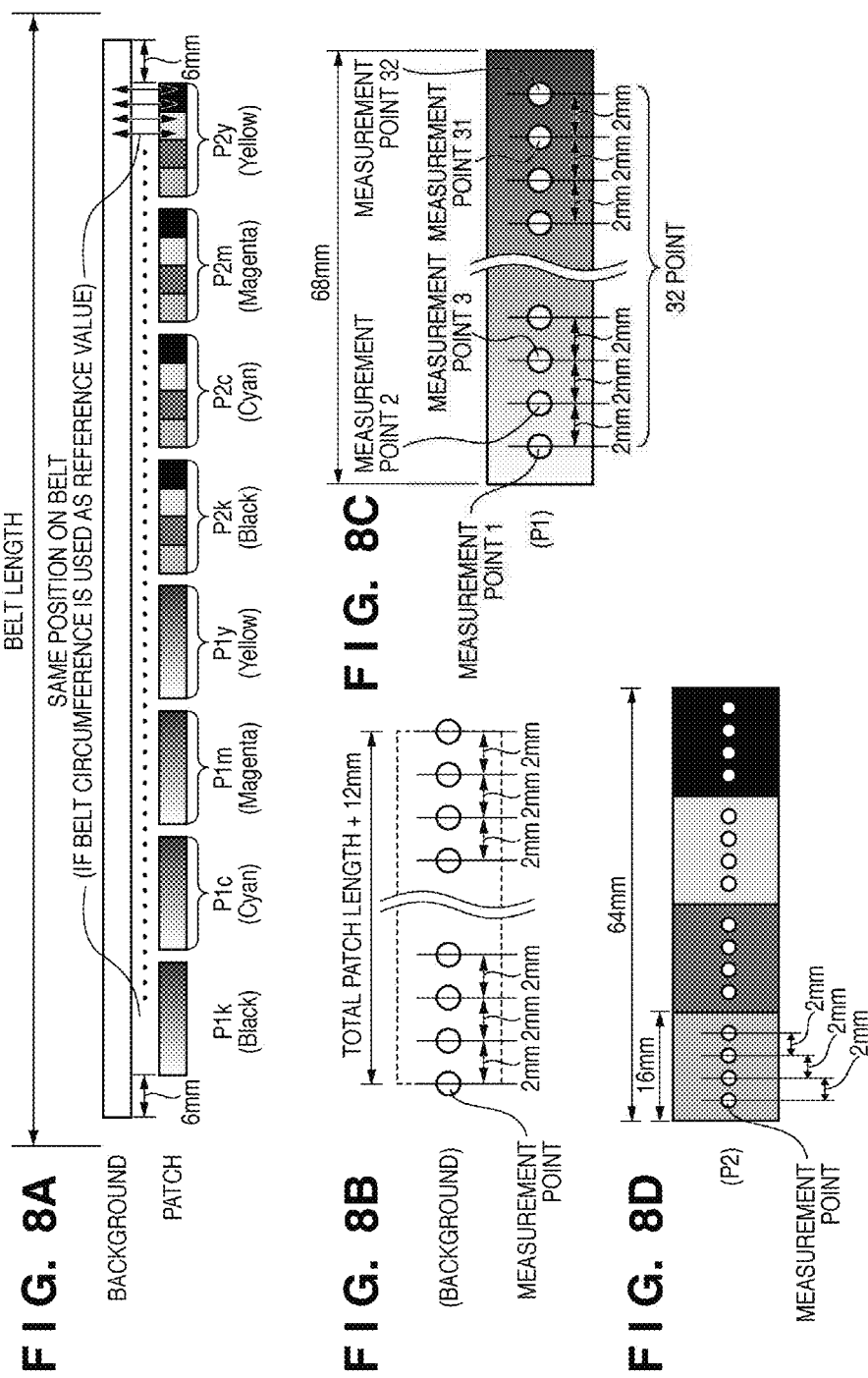
FIG. 8A is a diagram showing the circumference of the intermediate transfer belt, the background, and all the patch images.
FIG. 8B is a diagram showing the measurement points of the background.
FIGS. 8C and 8D are diagrams showing the relationship between the patch image and the measurement points.
Figure 10A:
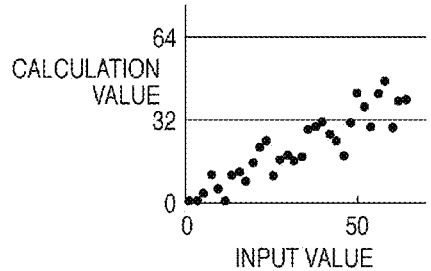
FIGS. 10A to 10G are graphs of density calculation results calculated based on the background data pieces.
Figure 10E:
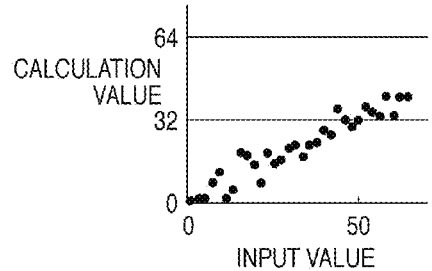
Figure 10B:
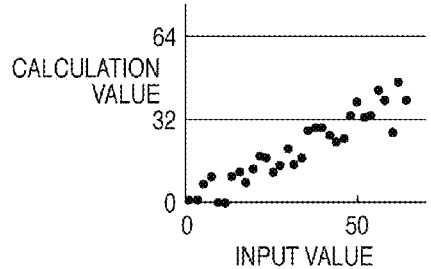
Figure 10F:
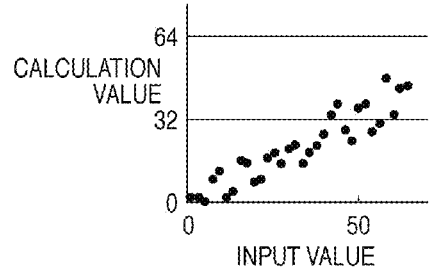
Figure 10C:
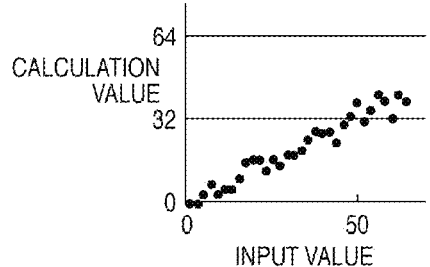
Figure 10G:
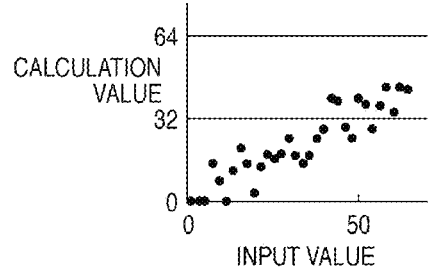
Figure 10D:
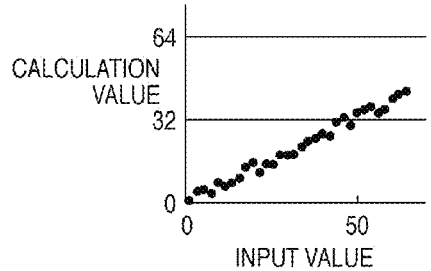

Next, image density control in the present embodiment is described with reference to FIGS. 6 to 8D. FIG. 6 is a flowchart showing the control procedure of image density control. FIG. 7 is a timing chart of image density control.

FIGS. 8A to 8D show patch images used for image density control, measurement points of patch images, and measurement points of a background. Note that patch images are toner images for adjusting image density that are formed by the image forming unit 108 on a rotation member such as the intermediate transfer belt 31. Here, a portion where the light receiving elements collect light actually corresponds to a certain region. A measurement point indicates that region. Alternatively, a measurement point may be interpreted as a representative point in that region. A measurement point shows a measurement position of the background or a patch image measured by the optical detection sensor 40 on the surface of the intermediate transfer belt 31.

FIG. 8A shows the circumference of the intermediate transfer belt 31, a background, and all the patch images. Patch images P1k, P1c, P1m, and P1y are patch images (toner images) having a gradation pattern in which the density continuously increases. In the gradation pattern, in the case where the maximum density is set to 255, set densities at measurement points are set to 2, 4, 6 . . . 62, and 64. Patch images P2k, P2c, P2m, and P2y are each composed of a plurality of (four) patch images having a uniform density that are successively disposed. Note that a uniform density here means that data that forms the basis of a patch image has a uniform density, and does not mean that the density of the actually formed toner image is completely uniform. The densities are respectively set to 80, 120, 40, and 180 in order. These patch images are formed by performing the electrophotographic process described above with reference to FIG. 2 under the instruction from the CPU 101.

FIG. 8B shows measurement points of the background. The length between the start and end points of the background measurement points is longer than the total patch length by 6 mm at both ends, or in other words, by 12 mm in total.

FIG. 8C shows the relationship between the patch image P1 and measurement points, and FIG. 8D shows the relationship between the patch image P2 and measurement points. For example, if the intermediate transfer belt 31 has an ideal length with no expansion and no contraction, the fourth background measurement point from the left of FIG. 8B and the first measurement point of the patch image P1 are detected at the same position on the intermediate transfer belt 31. This corresponds to FIG. 1D, which will be described in detail later.

In FIGS. 8B and 8C, with regard to the intermediate transfer belt 31 in the present embodiment, a specular reflection component tends to be more influenced by the surface reflectance of the intermediate transfer belt 31 than a diffuse reflection component. In order to prevent the measurement position of the light receiving element 40b of the optical detection sensor 40 that detects a specular reflection component from overlapping the next measurement position, it is desirable to make settings such that a measurement interval is 1.5 mm or more, which is an aperture diameter of the light receiving element 40b. In the present embodiment, an interval of 2 mm is used as an example. Note that it has been confirmed that even in the case where the measurement positions for specular reflection light overlap, similar effects to those in the case described later with reference to FIGS. 10A to 10G can be obtained, although detection deterioration is slightly observed. Accordingly, the interval of measurement points is not limited to 2 mm.

In FIG. 8B, the length of all the patch images is set so as to be shorter than the circumference of the intermediate transfer belt 31. The relationship between the total length of the intermediate transfer belt 31 and the total length of the background is shown in the upper portion in FIG. 8A. Further, the length formed by the measurement points of the background is set to be longer by 6 mm each from the start and end of the patch images (three points before and after the patch images as measurement points), with respect to all the patch images. As described above, the circumference of the intermediate transfer belt 31 changes. Thus, according to the expected amount of change in the circumference relative to the reference circumference, settings are made such that the length formed by the measurement points of the background is secured to be longer than the length formed by the measurement points of all the patch images. Note that 6 mm used in the present embodiment is the maximum length change in the circumference that is expected with respect to the intermediate transfer belt 31 in the present embodiment. Thus, if the material or the manufacturing method of the intermediate transfer belt 31 is changed, it goes without saying that other values may be adopted, rather than 6 mm.

Now, the flowchart in FIG. 6 is described. The processing described below is realized by the CPU 101 reading a control program stored in the ROM 102 to the RAM 103, and executing the program.

In S101, upon the start of image density control, the CPU 101 starts the rotation operation of the intermediate transfer belt 31 by causing the driving roller 8 to be rotationally driven. Subsequently, in S102, the CPU 101 causes the light emitting element 40a of the optical detection sensor 40 to emit light under a predetermined light amount setting. After that, in S103, the CPU 101 functions as a first obtaining unit, and waits for stabilization of the amount of light of the light emitting element 40a for a predetermined time period. Then, after that, in S104, reflected light signals (background data) Bb and Bc from the background of the belt 31 start to be obtained using the light receiving elements 40b and 40c. Specifically, in S104, the CPU 101 detects background data as described with reference to FIG. 8A using the optical detection sensor 40, and stores detected data in the RAM 103.

Next, in S105, the CPU 101 functions as a second obtaining unit, and controls the units of the image forming unit 108 to form the patch images P1k to P2y of respective colors shown in FIG. 8A, and obtains reflected light signals (patch data) Pb and Pc from the patch images using the light receiving elements 40b and 40c. The CPU 101 detects background data described with reference to FIG. 8A using the optical detection sensor 40, and stores detected data in the RAM 103, which is the same as in S104.

At this time, the CPU 101 causes the image forming unit 108 to form patch images at positions shifted by a predetermined change in the circumference of the intermediate transfer belt 31 (6 mm corresponding to the maximum length change in the circumference of the intermediate transfer belt 31 in the present embodiment) from the start position for obtaining background data. For example, based on the timing at which obtaining of background data is started, the image forming unit 108 starts exposure of a patch image at the timing at which the intermediate transfer belt 31 has rotated by the length obtained by subtracting the distance between the position where the photosensitive drum 2 is exposed by the exposing device 4 and the optical detection sensor 40 from the length corresponding to the reference circumference of the intermediate transfer belt 31 plus 6 mm. Note that patch data of the reflected light signals Pb and Pc indicate light intensity according to the density of the patch image serving as a detection target. Although corrected toner patch data is defined as toner patch reflected light data in the description below, patch data before being corrected is also a type of toner patch reflected light data.

Next, in S106, the CPU 101 turns off the light emitting element 40a of the optical detection sensor 40 upon the end of obtaining of patch data with respect to all the patch images using the optical detection sensor 40. Subsequently, in S107, the CPU 101 selects the position of the background data at a position closest to the background on which patch images are formed, with respect to patch data pieces. Specifically, here, background data according to which the measurement position of the measurement points of patch data and the measurement position of the measurement points of the background data substantially match is selected. Note that selection of background data denotes to select which measurement point of background data to correspond to each measurement point of patch data. The method for selecting background data is described later. In the present embodiment, the CPU 101 selects the above background data using, for example, patch data of only the patch image P1k as the obtaining result in S105 and background data obtained in the vicinity of the measurement position of the measurement points of the patch data P1k in the background data as the obtaining result in S104. However, the present invention is not limited to this, and in order to select the above background data, all or a part of the patch data (P1k to P2y) obtained in S105 and background data corresponding thereto may be used.

After that, in S108, the CPU 101 calculates the density of the patch image having reduced influence of the background (surface of the rotation member) based on the patch data Pb and Pc and the result of the background data Bb and Bc at the position closest to the background on which patches are formed (background data selected in S107). For example, the density of a patch image formed by the following expression is calculated using Bb, Bc, Pb, and Pc.

$$\text{Toner patch reflected light data}(TD) = (Pb - (\alpha * Pc))/(Bb - (\alpha * Bc)) \quad \text{Expression 1}$$

$$\text{Density} = 255 - (255 \times TD \times \beta) \quad \text{Expression 2}$$

Figure 4:
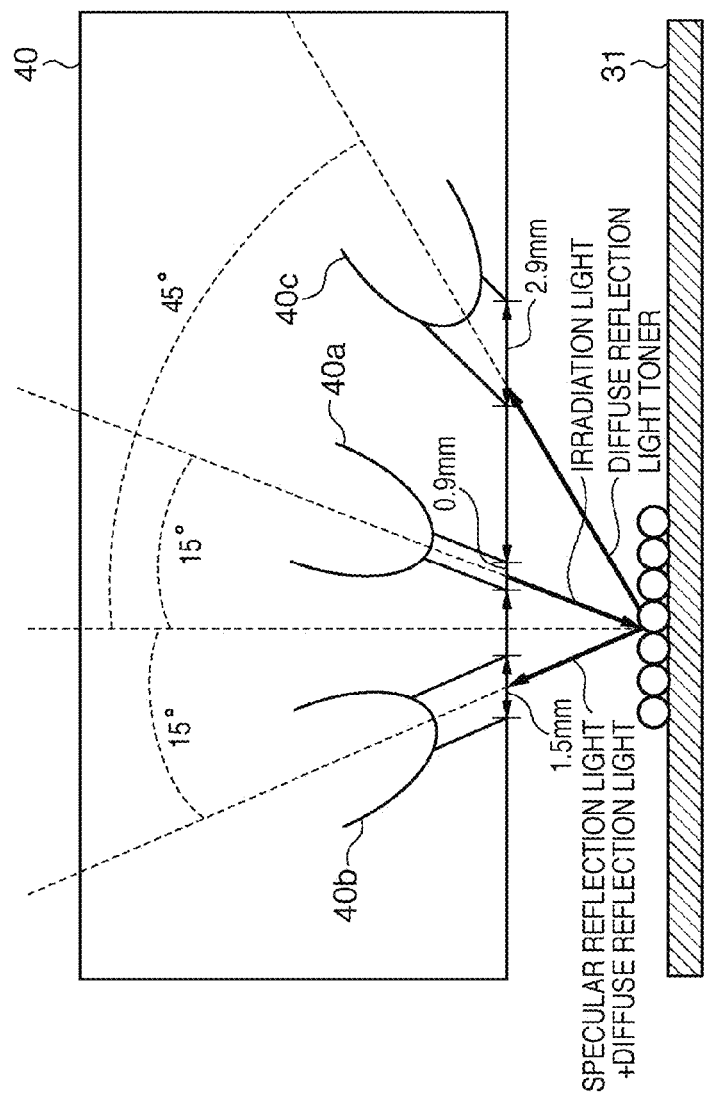
FIG. 4 is a diagram showing an example of a configuration of an optical detection sensor 40.
Figure 5:
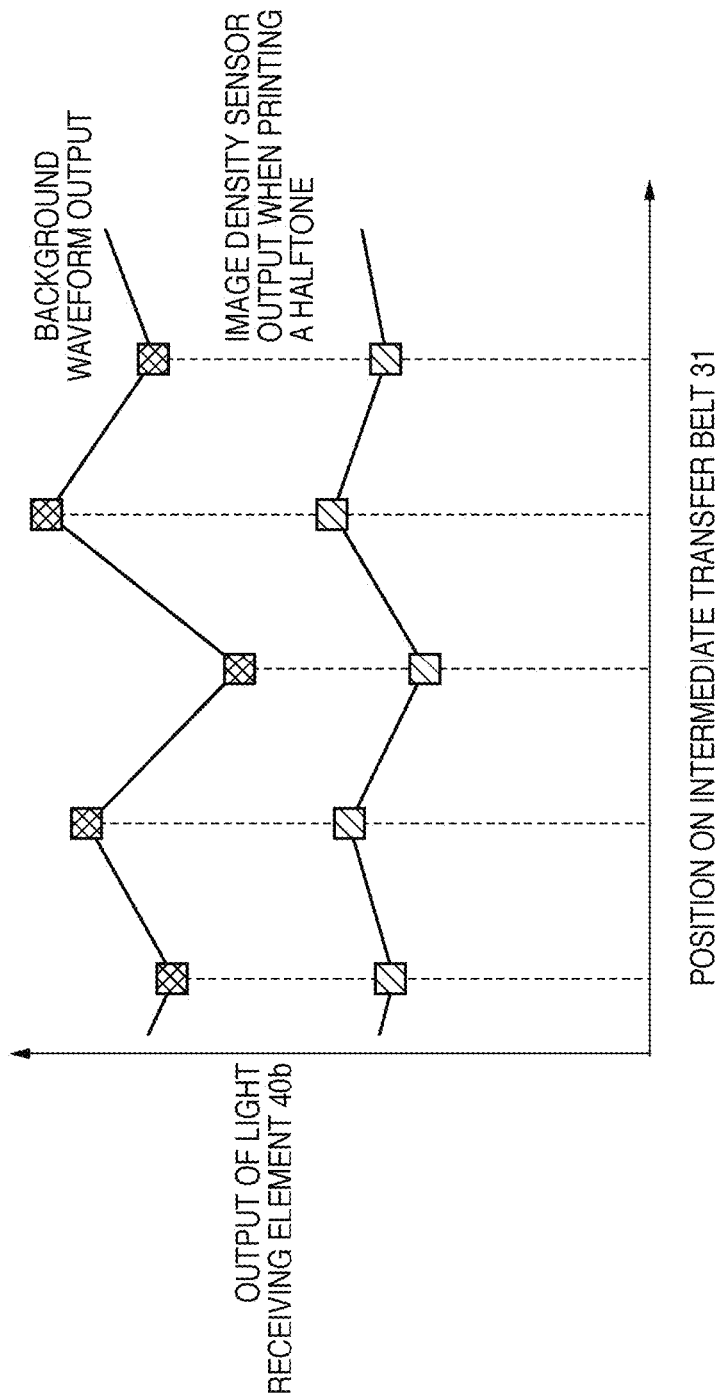
FIG. 5 is a diagram showing a correlation between sensor output on the surface of an intermediate transfer belt 31 and sensor output when a halftone is printed at the same locations.

Here, the reason for subtracting a diffuse reflection component from both the patch image and the background is to remove a diffuse reflection light component in reflected light detected by the light receiving element 40b, as shown in FIG. 4, and detect a more accurate specular reflection light component. Further, $\alpha$ and $\beta$ are constants. $\alpha$ is a value determined based on the sensitivity ratio of the light receiving element between the amount of specular reflection light and the amount of diffuse reflection light with respect to patch images of respective colors. In other words, $\alpha$ is a value for eliminating the difference in the light receiving sensitivity between the light receiving element 40b and the light receiving element 40c. $\beta$ is a constant for causing toner patch reflected light data (TD) to be at the same level as that of the input value of patch density. The constants $\alpha$ and $\beta$ are determined based on characteristics of the optical detection sensor 40 and characteristics of the amount of reflected light from patch images with respect to the optical detection sensor 40. In the present embodiment, values stored in the ROM 102 in advance are used for the constants $\alpha$ and $\beta$.

The above expression 1 is for substituting the specular reflection component for the diffuse reflection component by subtracting the multiplication result of the constant $\alpha$ and the diffuse reflection signal (Pc, Bc) with respect to the specular reflection signal Pb of a patch image. Further, the net specular reflection light received by the light receiving element 40b when the patch image is irradiated with light is calculated by the division with the amount of reflected light Bb from the background. The toner patch reflected light data (TD) approaches 0 the more the actual amount of adhered toner increases, and approaches 1 the more the amount of adhered toner decreases.

The above expression 2 is an arithmetic expression for causing the toner patch reflected light data (TD) to be at the same level as that of the input value of patch density. The present embodiment is an example in the case where the density for the toner patch reflected light data (TD) can be replaced using a linear line. On the other hand, if replacement using a linear line is not possible due to characteristics of the optical detection sensor 40 or toner, it is desirable to use a method for converting the density corresponding to each toner patch reflected light data (TD) using a one-to-one table. Note that in S107 described above, using the above expressions 1 and 2, a part of patch data (density data) (P1k) as the obtaining result in S105 is normalized, and correction density data is calculated. At that time, such correction density data as described above is calculated for each of a plurality of background data (including first background data and second background data) at background data measurement positions used for calculation that have been shifted by the predetermined amount, so as to determine a calculated result with the smallest variation between a plurality of density values included in each correction density data. Then, the CPU 101 selects a calculated result with the smallest variation as correction density data that has been corrected, in accordance with the determination. The measurement position of the background data used for the calculated result selected here is a position closest to the measurement position of patch data. Accordingly, in S108 after that, correction density data for the remaining patch data is calculated using background data shifted by the same amount as that of the background data used for the selected calculated result.

Next, in S109, the CPU 101 updates a look-up table stored in the ROM 102 or the like based on the calculated density. Subsequently, in S110, the CPU 101 causes the cleaning blade 33 to completely remove toner adhering on the intermediate transfer belt 31, stops rotation of the intermediate transfer belt 31 by stopping rotational drive of the driving roller 8 in S111, and ends image density control.

The processing described above is not limited only to the procedure shown in the flowchart in FIG. 6, and continuous processing may be performed in parallel by the units. For example, as in the timing chart shown in FIG. 7, turning off of the light emitting element 40a, cleaning of the intermediate transfer belt 31, calculation of density, and update of the look-up table may be performed in parallel.

Matching of Density Data and Background Data

Next, with reference to FIGS. 1A to 1G and 9 to 13, a method for selecting background data at a position closest to the background on which patch images are formed when calculating density is described. FIGS. 1A to 1G show a part of the patch image P1 shown in FIG. 8C and measurement points of the background in the neighborhood where the patch image P1 is formed. Note that the numbers of the measurement points in FIGS. 1A to 1G are numbers for showing the relationship between the position of the measurement points of the background and the measurement points of the patch image calculated using the expressions 1 and 2, and are not related to the number of the measurement points described with reference to FIG. 8C. In the case where the circumference of the intermediate transfer belt 31 has not changed from the reference circumference with respect to the patch image P1 due to the patch image formation timing and the patch data obtaining timing described above, the background position closest to the patch image P1 is as shown by (D). In other words, the measurement position of the measurement points shown by (D) is the reference position.

If the circumference of the intermediate transfer belt 31 has changed, the measurement points that are the background position closest to the patch image P1 are shown by (A) to (G) except (D), according to respective changes in the circumference. In other words, (A) to (G) except (D) show that measurement points are shifted from (D) that shows the reference position of the measurement points, by a predetermined amount. (A) shows the case of reference circumference minus 6 mm. (B) shows the case of reference circumference minus 4 mm. (C) shows the case of reference circumference minus 2 mm. (E) shows the case of reference circumference plus 2 mm. (F) shows the case of reference circumference plus 4 mm. (G) shows the case of reference circumference plus 6 mm. In other words, background data pieces shown by (A) to (G) are data with measurement positions of detected data obtained by detecting the surface of the intermediate transfer belt 31 at a plurality of measurement points using the optical detection sensor 40 being each shifted by a predetermined amount from the reference position. Note that with regard to background data pieces shown by (A) to (D) shown in FIGS. 1A to 1D, any of the background data is referred to as first background data, and the other background data is referred to as second background data, so as to distinguish the data pieces. On the other hand, patch data pieces (density data of patch images) shown by (A) to (G) are detected data obtained by the optical detection sensor 40 detecting the patch image at a plurality of measurement positions. According to the present embodiment, in respective combinations of each of a plurality of background data pieces (first background data and second background data) and density data, correction density data obtained by normalizing the above density data using the above expressions 1 and 2 (first correction density data and second correction density data) is calculated. Moreover, the background data used for a calculated result with the smallest variation between density values in the data pieces is selected from among the calculated results of a plurality of combinations. The selected background data is background data at a position closest to the background on which patch images are formed. Below is a detailed description.

First, the CPU 101 obtains densities at the measurement points 1 to 32 of the patch image P1, with respect to intermediate transfer belt positions (A) to (G), using the expressions 1 and 2 described above. Examples of calculated results are shown in FIG. 9. FIGS. 10A to 10G show graphs in which the horizontal axis represents input values, and the vertical axis represents calculated densities, with respect to all of (A) to (G) in FIGS. 1A to 1G. Note that all the data shown in FIGS. 1A to 1G is stored in the RAM 103. Patch data is influenced by the background as described above with reference to FIG. 5. Therefore, variation is the smallest in the case where density is calculated with reduced influence of the background using the background data at a position close to a position in which a patch image is formed. The present embodiment is a measurement example in the case where the circumference of the intermediate transfer belt 31 has not changed from the circumference reference value, and it can be confirmed that variation is the smallest at the position of the intermediate transfer belt position (D) from the graphs. Since the patch image P1 is an image in which density continuously changes, the degree of variation can be obtained by the following expression, for example.

$$\text{The degree of variation} = \Sigma^n{}_{i=2} |X_i - X_{i-1}| \qquad \text{Expression 3}$$

Here, i indicates a measurement point of the patch image P1. $X_i$ indicates the density at the measurement point i. n indicates the number of measurements.

Figure 11:
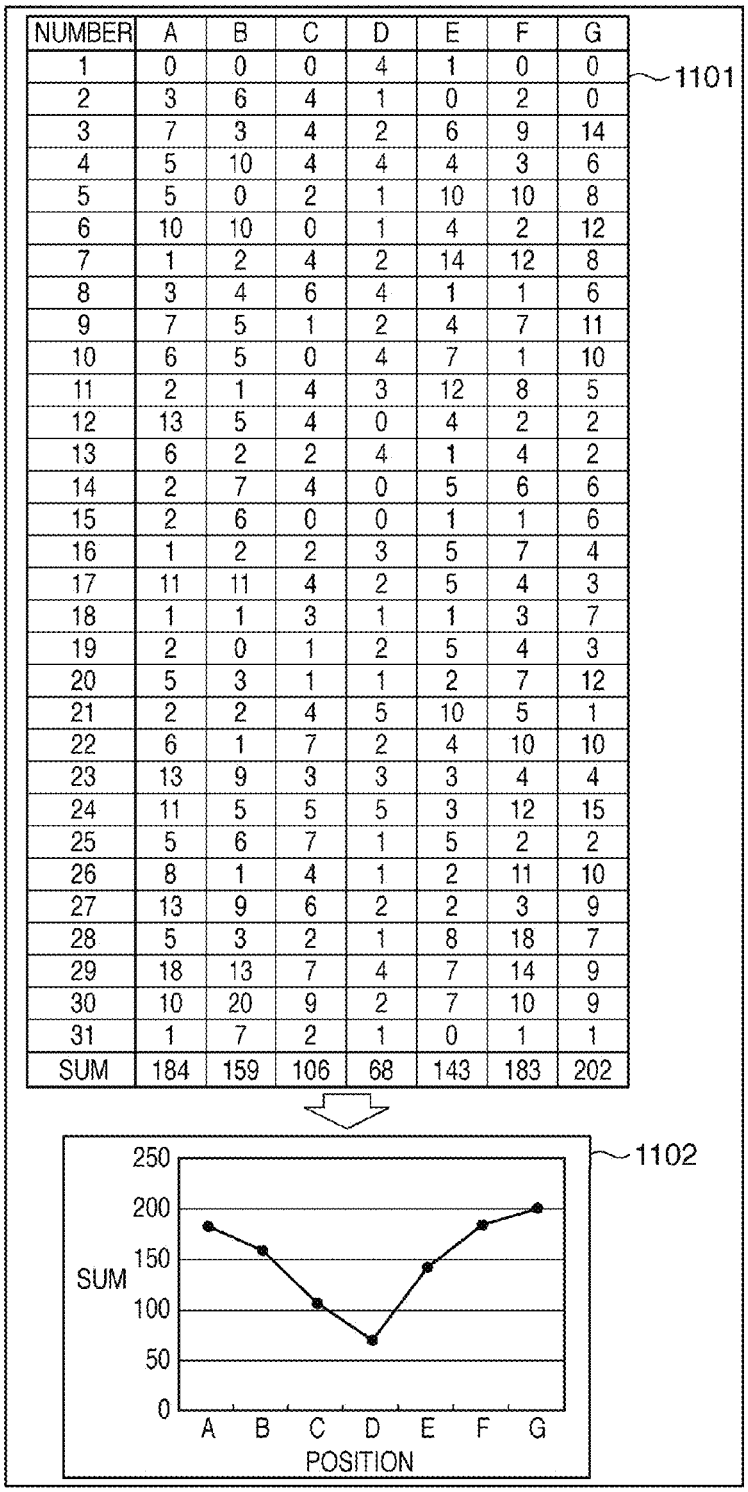
FIG. 11 is a diagram showing results of calculations of the calculated degree of variation in density.

The above expression 3 shows the total value of difference absolute values of the densities of adjacent patch data. The CPU 101 can obtain the degree of variation in the calculated result of the density of patch data for each of the intermediate transfer belt positions (A) to (G) using the expression 3. FIG. 11 shows examples of results calculated with respect to the intermediate transfer belt positions (A) to (G) using the expression 3. All the shown data is stored in the RAM 103, as with the cases of FIGS. 9 to 10G. Data having the smallest total value (smallest variation) among the calculated total values at the intermediate transfer belt positions (A) to (G) shown by reference numeral 1101 is considered as being the background data for the patch image P1. (D) is selected in the present embodiment.

Reference numeral 1102 shows a graph in which the horizontal axis represents intermediate transfer belt positions, and the vertical axis represents total values. It can be confirmed that data obtained by calculating density using background data at a position closer to the background on which patch images are formed has a smaller variation. Further, the circumference of the intermediate transfer belt 31 can be obtained based on the selected background data position. Here, since the intermediate transfer belt position (D) has been selected, it is determined that the circumference of the intermediate transfer belt 31 has not changed from the reference circumference. Specifically, based on the amount of shift of the measurement point in first background data or second background data, the circumference of the intermediate transfer belt 31 can be specified. This can be achieved since measurement points are provided at constant intervals, and the above amount of shift is gradually set to, for example, 2 mm, 4 mm, and 6 mm. For the patch image P2, based on the obtained circumference of the intermediate transfer belt 31 (here, the reference circumference), a background data position corresponding to each patch image is selected. The above processing is performed with respect to each color, and background data selection processing for each patch data ends. In other words, for the patch image P2, the calculated result for the patch image P1 is reused. Although it is not necessary to specify the circumference of the intermediate transfer belt 31 in density control in the present embodiment, the specified circumference of the intermediate transfer belt 31 can be utilized for other than density control. For example, using the specified circumference of the intermediate transfer belt 31, and the rotational speed of the intermediate transfer belt 31, a reaching time until when a toner image transferred onto the intermediate transfer belt 31 reaches a secondary transfer position can be accurately grasped. Accordingly, resist precision when transferring a toner image onto a recording material at a secondary transfer position (relative positional relationship in the sub-scanning direction between the recording material and the toner image) can be improved.

Difference from Comparative Examples

Figure 12:
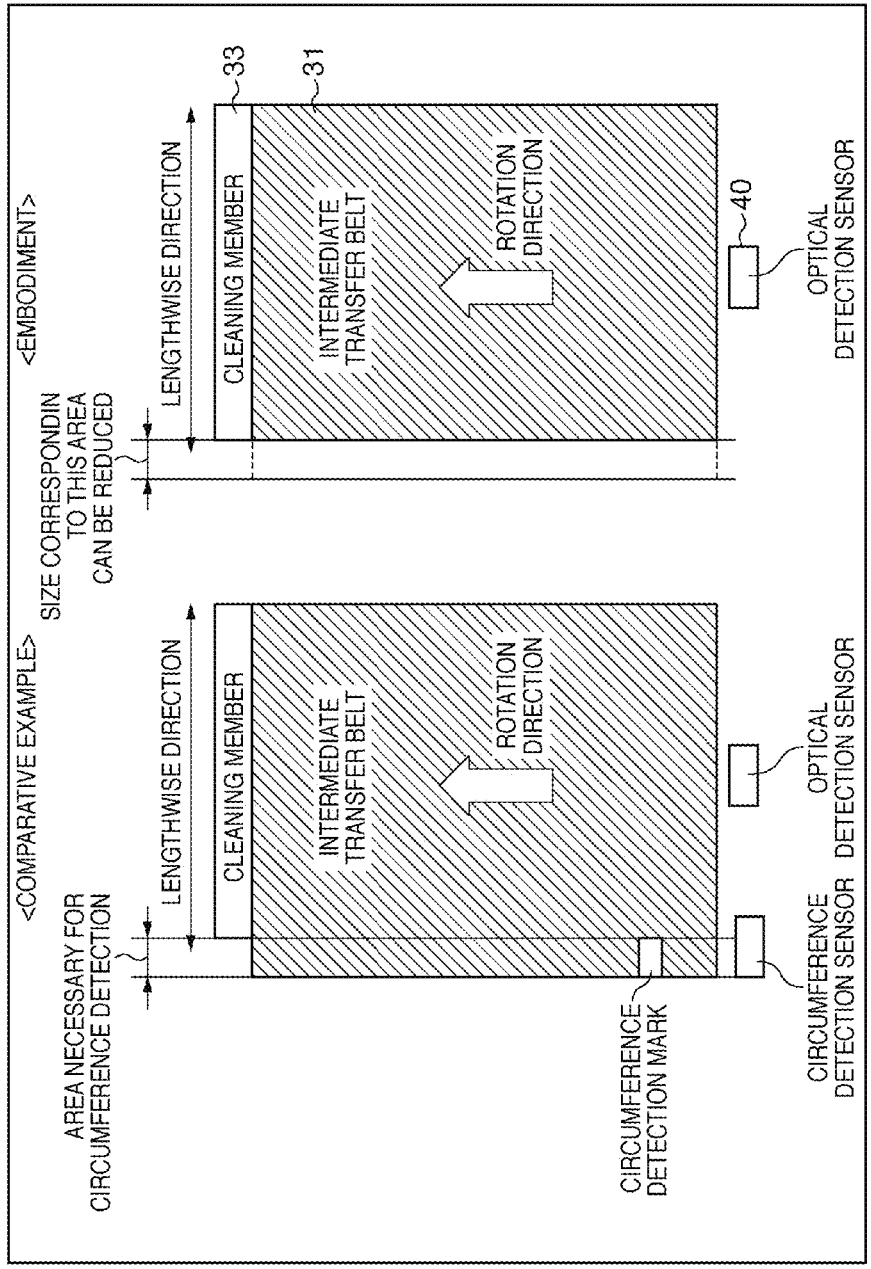
FIG. 12 is a diagram showing a comparison between a comparative example and a present configuration example of an intermediate transfer belt.

Next, a difference of an image density control time and a configuration of an image forming apparatus between the present embodiment and comparative examples is described with reference to FIG. 12. FIG. 12 shows the difference of the configuration in the vicinity of the intermediate transfer belt between the present embodiment and comparative examples. As shown in FIG. 12, in the comparative examples, a circumference detection mark and a circumference detection sensor for measuring the circumference of the intermediate transfer belt are installed, unlike the present embodiment. In the comparative examples, the circumference detection sensor detects the circumference detection mark, and measures a time period for the circumference detection mark to make one full rotation, thereby enabling the circumference of the intermediate transfer belt to be obtained.

In the image density control in the configuration as that in the comparative examples, there is a method in which the circumference of the intermediate transfer belt is measured using the circumference detection sensor and the circumference detection mark, and thereafter background data and patch data are obtained, and background data corresponding to each patch data is selected based on the circumference of the intermediate transfer belt (comparative example 1). Alternatively, there is also a method in which background data is obtained on the basis of the detection timing of the circumference detection mark, and with respect to the obtaining of patch data as well, data is obtained on the basis of the detection timing of the circumference detection mark after the intermediate transfer belt makes one full rotation, and a background position for each patch data is selected (comparative example 2). Further, there is also an image forming apparatus that applies a reverse bias to that applied when performing image formation to a photosensitive drum, transfers toner on the intermediate transfer belt onto the photosensitive drum, and has a cleaning apparatus that performs cleaning using a cleaning blade of a process cartridge. There is also a method in which in such a configuration, a circumference detection mark (patch image) different from a patch image for image density control is formed, and background data is selected using a similar method to that in the configuration having a circumference detection mark (comparative example 3).

Figure 13A:
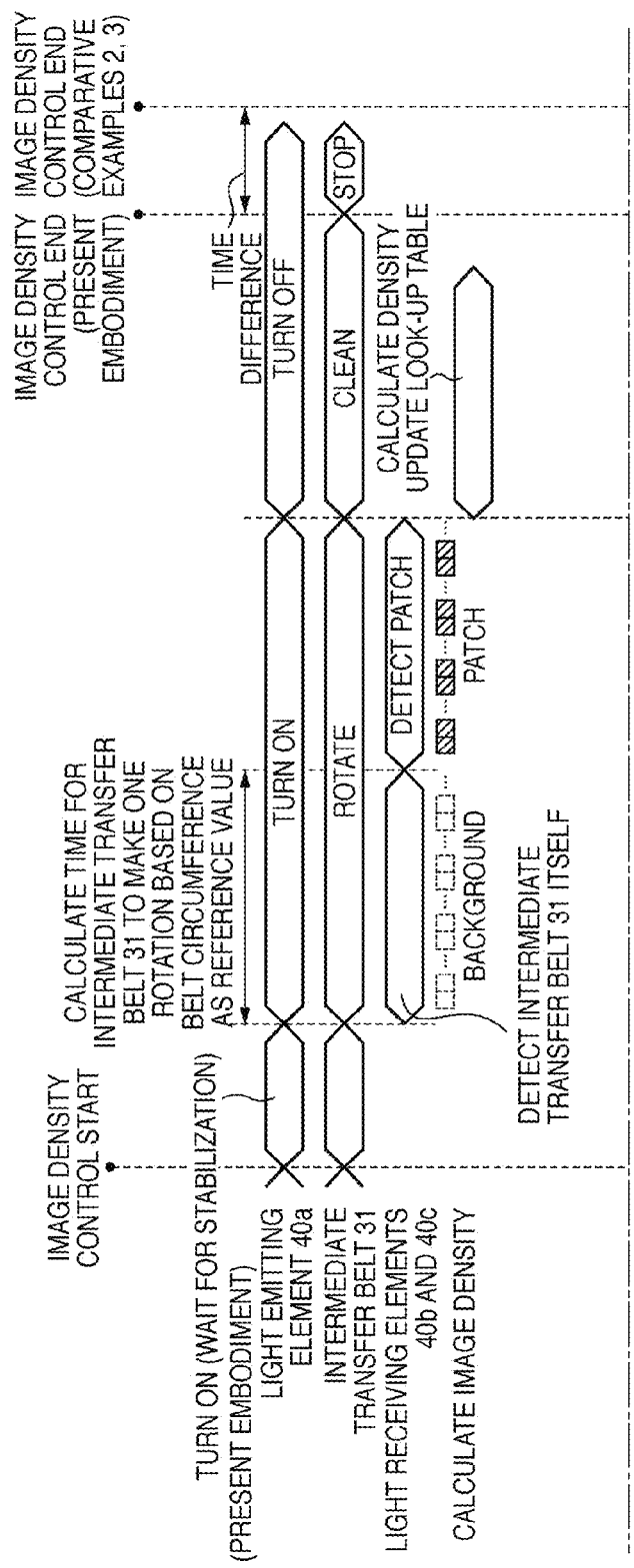

Next, a time difference between image density control in the comparative examples 1 to 3 described above and image density control in the present embodiment is described with reference to FIGS. 13A to 13C. In the present embodiment, background data of the intermediate transfer belt 31 can be obtained from the timing at which the amount of light of the light emitting element 40a is stabilized, and thus it is possible to shorten a time period until detecting the circumference detection mark, which is necessary in the comparative examples, and a time period for detecting the circumference of the intermediate transfer belt 31. Further, compared with the case of the comparative examples 1 and 2 in which the circumference detection sensor and the circumference detection mark are installed, a cost effect of eliminating the need to install the circumference detection sensor and the circumference detection mark is achieved.

As described above, with respect to a plurality of intermediate transfer belt positions in the vicinity of the background positions corresponding to patch images, the image forming apparatus according to the present embodiment obtains the density of each patch image, and selects a background position whose result indicates the smallest variation among the obtained results. Accordingly, it is possible to select background data at a position closest to the background on which patch images are formed. Further, the circumference of the intermediate transfer belt can be obtained based on the selected background position. Note that although a calculation for measuring the degree of variation is performed by integration of difference absolute values for background position selection in the present embodiment, a method may be used in which a correlation coefficient of an output value for an input value of patch density may be obtained, and a background position at which a correlation coefficient is closest to 1 is selected. For example, if an input value of patch density for each measurement point i is represented by $X_i$, a calculated density of each patch image is represented by $Y_i$, and the number of measurements is represented by n, a correlation coefficient can be represented by the following expression.

[Expression 4]

$$\text{Correlation function} = \frac{\sum_{i=1}^{n}(Xi - X_{avg})(Yi - Y_{avg})}{\sqrt{\sum_{i=1}^{n}(Xi - X_{avg})^2} \sqrt{\sum_{i=1}^{n}(Yi - Y_{avg})^2}} \qquad \text{Expression 4}$$

Here, $X_{avg}$ and $Y_{avg}$ indicate the arithmetic mean of respective data. It goes without saying that even if calculation is performed using, other than this, the degree of deviation from an approximated curve based on variance, standard deviation, or a least square method, for instance, a similar effect can be obtained. When the CPU 101 evaluates the degree of variation, various predetermined arithmetic expressions are applicable. Further, a set density of patch images, the number of measurement points, and the intervals are also examples, and are not limited to the values described above.

As described with reference to FIGS. 1A to 1G, background data corresponding to patch data at measurement points obtained in S105 in FIG. 6 is determined from among background data obtained in S104 in FIG. 6 by changing an extraction starting point. Specifically, each of the background data (A) to (G) is mostly composed of overlapping data, and memory capacity can be saved in preparing the plurality of types of background data (A) to (G).

Second Embodiment

Next, a second embodiment is described with reference to FIGS. 14A to 18B. In the present embodiment, for patch images in image density control different from those in the first embodiment, a method for selecting background data at a position closest to the background on which patch images are formed is described. In the present embodiment as well, the system configuration of the image forming apparatus described with reference to FIGS. 1A to 9 in the first embodiment is used. Accordingly, since a description of the image forming apparatus, image formation operation, and image density control that are common is the same as that of the first embodiment, here, the description is omitted.

Patch Images Used for Image Density Control

First, with reference to FIGS. 14A to 14C, patch images used in image density control in the present embodiment is described. FIG. 14A shows a background and a general view of patch images. Patch images P1$k$, P1$c$, P1$m$, and P1$y$ are patch images having a uniform density with different toner colors. Each of the patch images is a toner image formed using a single toner color. The same also applies to patch images P2 and P3. The densities of the patch images P1, P2, and P3 are respectively set to 40, 80, and 180 in the case where the maximum density is set to 255. FIG. 14B shows measurement points of the background. FIG. 14C shows measurement points of the patch images P1, P2, and P3.

The length of all the patch images is set to be shorter than the circumference of the intermediate transfer belt 31, and the length formed by the measurement points of the background is set to be longer by 6 mm each from the start and end of the patch images (three locations before and after the patch images as measurement points), with respect to all the patch images. The circumference of the intermediate transfer belt 31 changes for the reasons described above. Settings are made such that the length formed by the measurement points of the background is secured so as to be longer than the length formed by the measurement points of all the patch images by the amount of change in the circumference expected with respect to the reference circumference. A method for setting measurement points of the background for patch images, and the interval of measurement points of patch images and the background are determined as described above, since the configuration of the optical detection sensor 40 is the same as that of the first embodiment, and for the same reason as that described in the first embodiment.

Matching of Density Data and Background Data

Next, a method for selecting background data at a position closest to the background on which patch images are formed when calculating densities is described with reference to FIGS. 1A to 1G, and 15 to 16G. FIGS. 1A to 1G show measurement points of a part of the patch image P1 shown in FIG. 14C and the background in the neighborhood where the patch image P1 is formed. As with the case of the first embodiment, if the circumference of the intermediate transfer belt 31 has not changed from the reference circumference with respect to the patch image P1 due to patch image formation timing and patch data obtaining timing described above, the background position closest to the patch image P1 is as shown by (D). On the other hand, if the circumference of the intermediate transfer belt 31 has changed, measurement points serving as the background position closest to the patch image P1 are as respectively shown by (A) to (G), according to the amount of change in the circumference.

Figure 15:
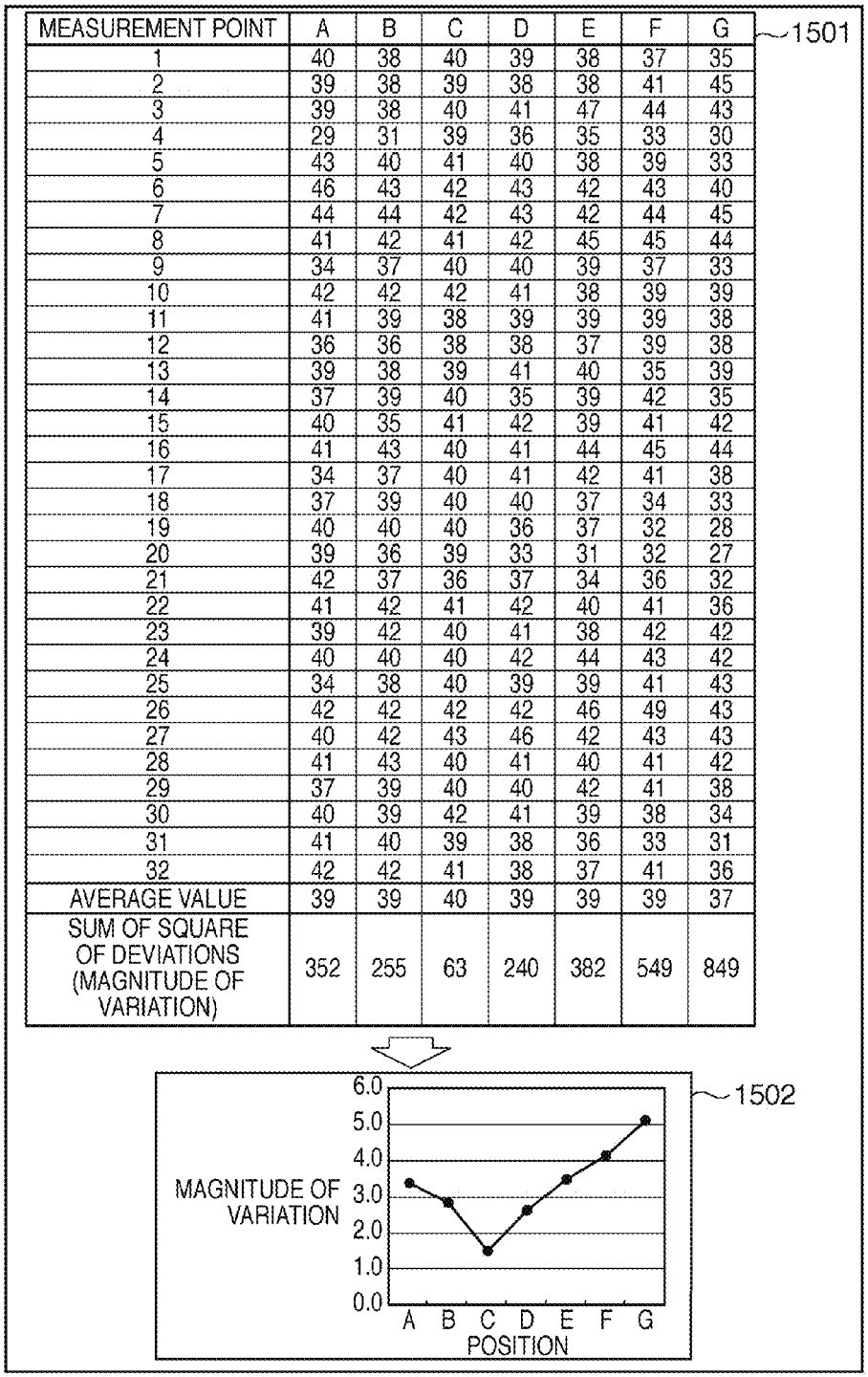
FIG. 15 is a diagram showing densities calculated based on background data pieces.
Figure 16A:
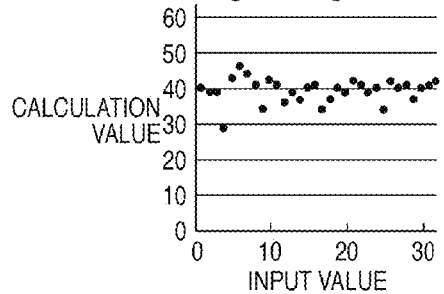
FIGS. 16A to 16G are graphs of density calculation results calculated based on the background data pieces.
Figure 16E:
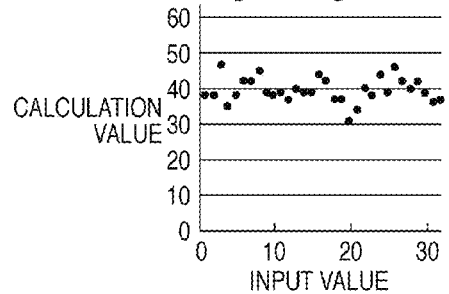
Figure 16B:
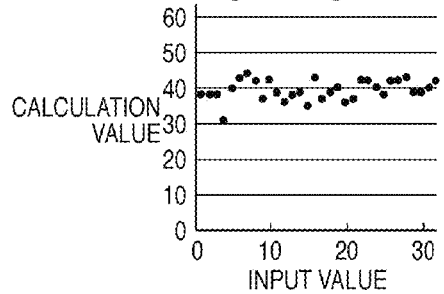
Figure 16F:
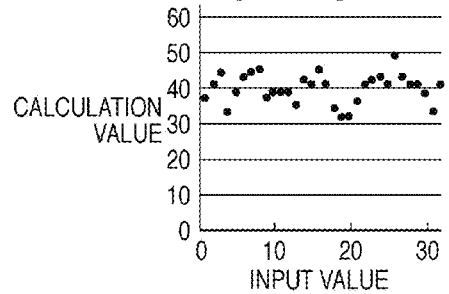
Figure 16C:
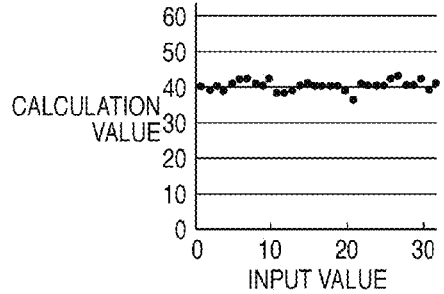
Figure 16G:
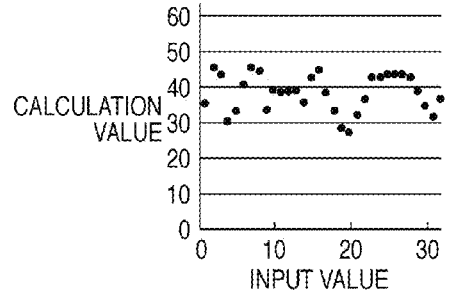
Figure 16D:
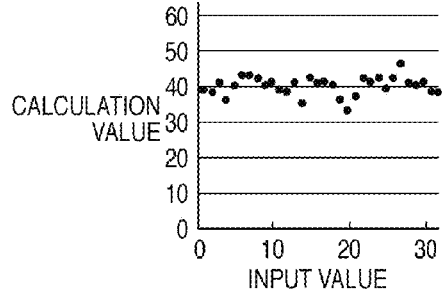
Figure 20A:
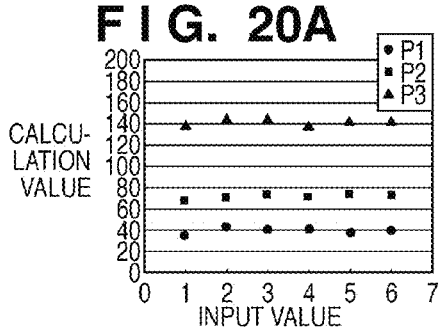
FIGS. 20A to 20G are graphs of density calculation results calculated based on the background data pieces.
Figure 20E:
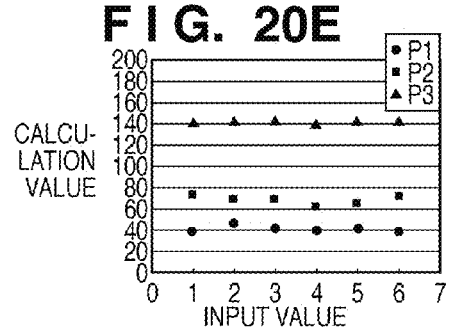
Figure 20B:
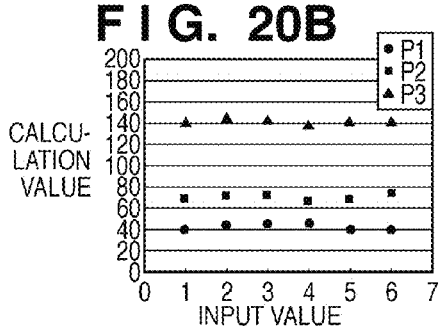
Figure 20F:
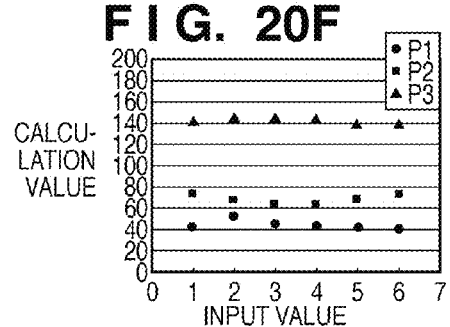
Figure 20C:
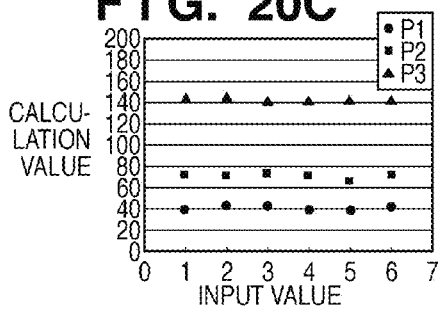
Figure 20G:
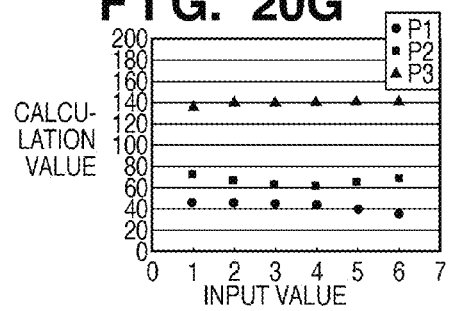
Figure 20D:
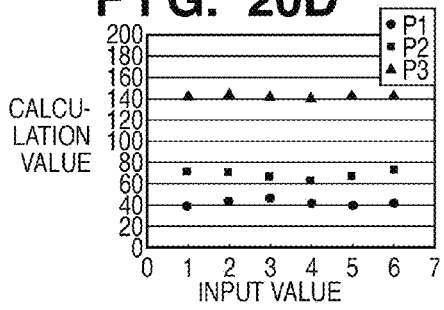

First, the CPU 101, using the expressions 1 and 2 described above, obtains the densities at the measurement points 1 to 32 of the patch image P1 with respect to the intermediate transfer belt positions (A) to (G). Examples of calculated results are shown by reference numeral 1501 in FIG. 15. Further, FIGS. 16A to 16G are graphs with regard to (A) to (G) in each of which the X axis represents measurement points, and the Y axis represents calculated densities described above. All the data shown in FIGS. 15 to 16G are assumed to be stored in the RAM 103. As described above with reference to FIG. 5, the patch data Pb and Pc is influenced by the background. Therefore, a variation is the smallest if, using the background data at a position close to a position where patch images are formed, the influence of the background is reduced, and the density is calculated. Here, the circumference of the intermediate transfer belt 31 is an example of measurement in the case where the circumference has changed by −2 mm relative to the circumference reference value, and it can be confirmed from the graphs that a variation is the smallest at a position of the intermediate transfer belt position (C). Since the patch image P1 is an image having a uniform density, for example, the degree of variation can be obtained by the following expression.

$$X_{avg} = (1/n) * \Sigma^n_{i=1} X_i$$

The degree of variation = $\Sigma^n_{i=1}(X_{avg} - X_1)^2$      Expression 5

Here, i represents a measurement point of the patch image P1. $X_i$ represents the density at a measurement point i. n represents the number of measurements.

The above expression 5 shows a total value of the square of the deviations in the density in each patch data. The CPU 101 obtains the respective degree of variations in the calculated results in the densities of patch data with respect to the intermediate transfer belt positions (A) to (G), using the expression 5. In FIG. 15, reference numeral 1501 shows examples of results calculated using the expression 5 with respect to the intermediate transfer belt positions (A) to (G). The CPU 101 uses a result that shows the smallest total value (smallest variation) among the calculated results for the intermediate transfer belt positions (A) to (G) as background data for the patch image P1. In the present embodiment, (C) is selected. In FIG. 15, reference numeral 1502 shows a graph in which the horizontal axis represents the intermediate transfer belt positions, and the vertical axis represents the degree of variation. It can be confirmed that data obtained by calculating densities using background data at a position closer to the background on which patch images are formed has a smaller variation. Further, the CPU 101 obtains the circumference of the intermediate transfer belt 31 based on the selected background data position. In the present embodiment, the intermediate transfer belt position (C) has been selected, and thus the circumference of the intermediate transfer belt 31 is determined as being the reference circumference minus 2 mm. Moreover, with regard to the patch images P2 and P3, the CPU 101 selects background data corresponding to each patch image based on the circumference of the intermediate transfer belt 31 that has been obtained. The CPU 101 performs the above processing for each color, and ends background-data selection processing with respect to each patch data.

As described above, even in the case of a patch image having a uniform density, the image forming apparatus according to the present embodiment obtains the densities of patch images with respect to a plurality of intermediate transfer belt positions in the vicinity of background positions for the patch images. Moreover, it is possible to select background data at a position closest to the background on which patch images are formed, by selecting a background position whose result shows the smallest variation among the calculated results. Further, it is possible to obtain the circumference of the intermediate transfer belt based on the selected background position.

Third Embodiment

Next with reference to FIGS. 17A to 21B, the present embodiment describes an example of control that further improves the precision of the method for selecting background data at a position closest to the background on which patch images are formed, which has been described in the above embodiments. In the present embodiment as well, the system configuration of the image forming apparatus described with reference to FIGS. 1A to 9 in the first embodiment is used. Accordingly, since a description of the image forming apparatus, image formation operation, and image density control that are common is the same as that of the first embodiment, the description is omitted here.

Patch Images Used for Image Density Control

First, with reference to FIGS. 17A to 17C, patch images used in image density control in the present embodiment is described. FIG. 17A shows a background and a general view of patch images. Patch images P1$k$, P1$c$, P1$m$, and P1$y$ are patch images having a uniform density with different toner colors. The same also applies to patch images P2 and P3. The densities of the patch images P1, P2, and P3 are respectively set to 40, 80, and 180 in the case where the maximum density is set to 255. FIG. 17B shows measurement points of the background. FIG. 17C shows measurement points of the patch images P1, P2, and P3.

The length of all the patch images is set to be shorter than the circumference of the intermediate transfer belt 31, and the length formed by the measurement points of the background is set to be longer by 6 mm each from the start and end of the patch images (three locations before and after the patch images as measurement points), with respect to all the patch images. The circumference of the intermediate transfer belt 31 changes for the reasons described above. Settings are made such that the length formed by the measurement points of the background is secured so as to be longer than the length formed by the measurement points of all the patch images by the amount of change in the circumference expected with respect to the reference circumference. Points of difference from the patch images in image density control used in the second embodiment are that the patch image length is short, and the patch images P1, P2, and P3 each have six measurement points. Note that although an example of utilizing the patch images used in the second embodiment is described in the present embodiment, the patch images used in the first embodiment may be utilized.

Relationship Between Evaluation of Variation and Number of Data Measurements

FIGS. 18A and 18B show the results of calculating a total value of the square of deviations using the expression 5 described above in the second embodiment with respect to the intermediate transfer belt positions (A) to (G) according to the number of measurements, with the number of measurements n of the patch image P1 described in the second embodiment being reduced. FIG. 18A shows calculated results, FIG. 18B is a graph in which the horizontal axis represents intermediate transfer belt positions, and the vertical axis represents the total values of the square of deviations.

As can be read from these results, if the number of measurements n decreases, the difference of the results of calculating the degree of variations using background data at a position closest to the background on which patch images are formed and other background data is reduced. In other words, if the number of measurements n is small, the precision of background data selection will deteriorate.

Matching of Density Data and Background Data

Next, a method for selecting background data at a position closest to the background on which patch images are formed when calculating densities is described with reference to FIGS. 20A to 21B. First, the CPU 101 obtains the densities at the measurement points 1 to 6 of the patch image P1 using the expressions 1 and 2 described above with respect to the intermediate transfer belt positions (A) to (G). Moreover, the CPU 101 obtains densities of the patch images P2 and P3 in the same manner. Examples of calculated results are shown in FIG. 19. FIGS. 20A to 20G are graphs in which the horizontal axis represents measurement points, and the vertical axis represents calculated densities.

Although the present embodiment describes an example of measurement in the case where the circumference of the intermediate transfer belt 31 has changed by −2 mm relative to the circumference reference value, the number of measurements is small for each patch image in the present embodiment, and thus it is not easy to confirm from the graphs that the position of the intermediate transfer belt position (C) has the smallest variation. However, as described above with reference to FIG. 5, since patch data is influenced by the background, a variation is the smallest if, using background data at a position close to a position where patch images are formed, the influence of the background is reduced, and the density is calculated.

The patch images P1, P2, and P3 are images each having a uniform density, the CPU 101 obtains, as the degree of variation, a total value of the square of deviations for the measurement points of each patch image, using the expression 5 described above in the second embodiment. Moreover, the CPU 101 totals the total values of the square of deviations calculated for patch data pieces for each intermediate transfer belt position. FIG. 21A shows examples of average values, total values of the square of deviations for each patch data (P1, P2, P3), and calculation results of total values of the square of deviations of all the patch data (P1+P2+P3). FIG. 21B is a graph in which the horizontal axis represents intermediate transfer belt positions, and the vertical axis represents total values of the square of deviations for each patch data (P1, P2, P3) and total values of the square of deviations of all the patch data (P1+P2+P3).

Although the total value of the square of deviations of the patch images P1 and P2 (P1 and P2) is smallest at the position (C), the total value of the square of deviations of the patch image P3 (P3) is smallest at the position (D). In other words, if the number of measurement points is small, appropriate background data may not be able to be selected in the case where only one of the patch images P1, P2, and P3 is used. However, appropriate background data can be selected by the comparison with the total value of the square of deviations of all the patch data (P1+P2+P3). Although an example in which background data is selected by calculation using all the patch images has been described in the present embodiment, the influence of the background increases the lower the density of a patch image, and thus it is desirable to select and use a patch image in ascending order of density, rather than simply using all the patch images, and secure the sufficient number of measurements, which enables determination of the degree of variation.

Note that although the case where the patch images P1, P2, and P3 each having a different toner density are measured has been described above, the present invention is not limited to this. For example, instead of the three patch images, P1, P2, and P3, four patch images of black, magenta, cyan, and yellow each having the same density and a different toner color may be equivalently used. Further, a plurality of patch images for which both the toner density and the toner color are different may be equivalently used. A similar effect can also be obtained in this case.

As described above, the image forming apparatus according to the present embodiment uses a plurality of patch images in the case where the patch images having a uniform density are small, and the number of measurements is small. Moreover, the density of each patch image is obtained with respect to a plurality of intermediate transfer belt positions in the vicinity of the background position for each patch image, and a background position used for the result in which the total of variations in the density of the patch images is small is selected. Accordingly, it is possible to select background data at a position closest to the background on which patch images are formed. Further, the circumference of the intermediate transfer belt can be obtained based on the selected background position.

Note that in the third embodiment, with regard to variation evaluation performed by the CPU 101, an example in which calculation of the total value of the square of deviations using the expression 5 described in the second embodiment has been described. However, the present invention is not limited to this. The CPU 101 may be caused to perform calculation using the expressions 3 and 4 described in the first embodiment. Further, the CPU 101 may be caused to perform calculation for obtaining the degree of deviation from an approximated curve based on variance, standard deviation, or a least square method, and the like, and a similar effect can be obtained in this case as well. Further, these are also similarly applied to the second embodiment.

Further, as described above, methods other than the method for evaluating the degree of variation are also applicable. For example, a method is also conceivable in which the CPU 101 calculates a correlation between a data string of density data (reflected light signals (patch data)) obtained by the optical detection sensor 40 before being normalized and a data string of background data.

More specifically, in this case as well, patch images that are formed are a plurality of toner images (for example, P1, P2, and P3) whose color and density is different from each other. The CPU 101 calculates a correlation value between density data and background data (corresponding to a first correlation value) for each of the above plurality of toner images. Specifically, with regard to individual toner images, density data and background data are detected at a plurality of measurement points, as described with reference to FIG. 17C, for example. The CPU 101 calculates a correlation value that indicates a correlation with regard to a data string of density data and a data string of background data.

Further, the CPU 101 prepares a data string of another background data at a background data measurement position that has been shifted by a predetermined amount, as described above. A correlation value (corresponding to a second correlation value) between a data string of density data and a data string of the other prepared background data is calculated for each of a plurality of the same toner images. Note that various known calculations are applicable to a method for calculating a correlation value.

The CPU 101 totals respective first correlation values of the above plurality of toner images and calculates a total value, and also totals respective second correlation values of the above plurality of toner images. Then, the CPU 101 compares the total value of the first correlation values with the total value of the second correlation values, and determines which has a higher correlation. Note that whether a correlation is high or is, conversely, low when the total value is greater is determined depending on the type of arithmetic expression related to a correlation to be adopted. In accordance with the background data determined as having a higher correlation, density data that has been corrected is obtained based on the mechanism described above.

Fourth Embodiment

In the above described embodiments, as described with reference to FIGS. 1A to 1G, background data corresponding to patch data at each measurement point obtained in S105 in FIG. 6 has been determined from among background data obtained in S104 in FIG. 6 by changing an extraction starting point. However, the present invention is not limited to this configuration.

For example, rather than the interval between measurement points of background data being constant (for example, 2 mm interval), an interval of 4 mm may be inserted here and there, such as ( . . . 2 mm, 2 mm, 2 mm, 4 mm, 2 mm . . . ). Note that in that case, the interval of measurement points of patches also needs to be the same interval. In this way, after setting background data as shown by (A) to (G), since it is sufficient to perform the same processing as in the above embodiments, a detailed description thereof is omitted.

As another example, if the memory capacity for storing patch data and background data is sufficiently large, all the intervals of measurement points of background data may be arbitrarily set. In this case as well, the interval of measurement points of patch data also needs to have the same interval pattern, which is the same as in the previous description. More specifically, background data pieces shown by (A) to (G) described with reference to FIGS. 1A to 1G are obtained in S104 in FIG. 6 as other background data that are all different from each other. Then, it is sufficient to perform the same processing as in the above embodiments, after storing the data as background data shown by (A) to (G) in the RAM 103.

Other Embodiments

The present invention is not limited to the embodiments described above, and can be modified in various ways. For example, although an image forming apparatus that has the intermediate transfer belt 31 has been described in the above description, the present invention can also be applied to an image forming apparatus that has adopted a method for directly transferring a toner image developed on the photosensitive drum 2 onto a transfer material. Specifically, the intermediate transfer belt 31 is replaced by a transfer material conveying belt (on a recording material carrier), and a patch image is formed on this transfer material conveying belt, which achieves the same effect. A patch toner image can be carried on the transfer material conveying belt, and in this point, similar to the intermediate transfer belt 31, the transfer material conveying belt can be caused to function as an image carrier.

In the above description, although a description has been given using a density as a parameter, a density corresponds to toner patch reflected light data one to one, and thus the present invention may be embodied using toner patch reflected light data as a parameter.

In the above description related to FIGS. 10A to 10G and 16A to 16G, although a description has been given in which background data with the smallest variation is obtained with regard to density data that has been normalized, the present invention is not limited to this. For example, more accurate background data may be calculated and obtained by performing interpolation processing or the like based on the relationship between a degree of variation and background data. In this way, the precision of image density control can be further improved.

In the description of the first and second embodiments, with regard to the density that has been normalized (standardized), it has been described that the degree of variation thereof is evaluated. However, even in the first and second embodiments, as in the third embodiment, a correlation between a data string of a detection value data (reflected light signals (density data)) obtained by the optical detection sensor 40 before being normalized and a data string of background data may be calculated, and background data having a high correlation may be adopted. Here, for example, "Pb" or "Pb−(α*Pc)" described above, or the like can correspond to the reflected light signals (density data). Further, for example, "Bb" or "(Bb−(α*Bc))" described above can correspond to background data.

If correlation calculation is more specifically described reusing FIGS. 1A to 1G, the CPU 101 calculates a correlation between reflected light signals for the measurement points 1 to 32 of the patch image P1 and background data at the positions (A) to (G) on the intermediate transfer belt. If FIG. 1C is used as an example, the CPU 101 calculates a correlation between reflected light signals (1, 2, 3 . . . ) (density data) from a patch image and background data (3, 4, 5 . . . ). The CPU 101 performs this calculation with respect to all the background data (A) to (G), and performs various calculations described above using background data with the highest correlation therebetween.

On the other hand, in terms of precision, a method for evaluating a variation in density data that has been normalized is more preferable than a method for obtaining a correlation between reflected light signals (density data) before being normalized and background data. The following is a description of this. As a method for evaluating a correlation between a data string An and data strings Bn1, Bn2 . . . Bnk, a method for evaluating the maximum value of calculated results of an autocorrelation function and a method for evaluating the minimum value of the sums of squares of differences are conceivable, for example. Note that respective background data pieces in FIGS. 1A to 1G can correspond to Bn1, Bn2 . . . Bnk. However, according to this method for calculating a correlation, the value of the sum total changes, depending on the size relationship between corresponding values in the data strings An and Bnk. Specifically, although a correlation is not the best with regard to the data strings An and Bnk, a calculation value of an autocorrelation function may be the maximum value. Further, although a correlation is not the best with regard to the data strings An and Bnk, a calculation value may be the minimum value.

On the other hand, if the CPU 101 performs a calculation to evaluate a variation in density data that has been normalized, such precision deterioration can be at least suppressed. In the patch density detection, a change in background data appears as a change in a reflected light signal. Accordingly, if respective data strings have a high correlation, background data and a reflected light signal have a relationship of similarity. The variation in density data that has been normalized is small, only in the case where the respective data strings have a high correlation. For such a reason, the method for performing a calculation to evaluate the variation in density data that has been normalized can be expected to have high precision.

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application Nos. 2010-083397 filed on Mar. 31, 2010 and 2011-026533 filed Feb. 9, 2011, which are hereby incorporated by reference herein in their entirety.

What is claimed is:

1. An image forming apparatus comprising:
a rotation member that is used for image formation;
a detection unit that irradiates a detection target with light and detects reflected light from the detection target;
a first obtaining unit that obtains background data at a first number of measurement positions, including a given number of measurement positions on the rotation members, based on a detection result of the detection unit by detecting reflected light from the rotation member, which is the detection target;
a second obtaining unit that obtains density data of a toner image at a second number of measurement positions lower in number than the first number of measurement positions, based on a detection result by the detection unit by detecting reflected light from the toner image for adjusting an image density of an image formed on the rotation member;
a calculating unit that
normalizes the density data in an obtaining result by the second obtaining unit based on first background data of the second number of measurement positions corresponding to a reference position of the measurement positions on the rotation member, which is assumed when a circumference of the rotation member is not changed from a reference circumference from among an obtaining result by the first obtaining unit, and calculates first correction density data, and
normalizes the density data in an obtaining result by the second obtaining unit based on a predetermined number of second background data in the second number of measurement positions, each of which have been respectively shifted by a different number from the measurement positions of the first background data, from among the obtaining result by the first obtaining unit, and calculates a predetermined number of second correction density data; and
a determination unit that determines that the correction density data has a smaller variation between a plurality of density values respectively included therein from among the first correction data and the predetermined number of second correction data, wherein corrected density data is obtained in accordance with the determination by the determination unit.

2. The image forming apparatus according to claim 1, further comprising:
a specifying unit that specifies a circumference of the rotation member based on the first correction density data or the second correction density data that have been determined as the corrected density data.

3. The image forming apparatus according to claim 1, wherein the determination unit comprises an evaluation unit that evaluates a degree of variation between a plurality of density values included in the first and second correction density data.

4. The image forming apparatus according to claim 3, wherein the evaluation unit evaluates the degree of variation in the first correction density data and the second correction density data, by a calculation in accordance with a predetermined arithmetic expression.

5. The image forming apparatus according to claim 3, further comprising:
a formation unit that forms, as the toner image, a gradation toner image having a different density at each of the measurement positions, or a single color toner image having a substantially uniform density at the measurement positions.

6. The image forming apparatus according to claim 1,
wherein there are a plurality of toner images, each having a mutually different color or density,
the calculating unit calculates the first correction density data and the second correction density data with respect to each of the plurality of toner images,
the evaluation unit obtains evaluation values of a degree of variation between the plurality of density values included in the first correction density data with respect to each of the plurality of toner images, and totals the obtained values, and obtains evaluation values of a degree of variation between the plurality of density values included in the second correction density data with respect to each of the plurality of toner images, and totals the obtained values, and
the determination unit determines which correction density data has a smaller variation based on the total of evaluation values of the first correction density data and the total of evaluation values of the second correction density data obtained by the evaluation unit.

7. The image forming apparatus according to claim 1, wherein an image forming condition is controlled based on the corrected density data.

8. The image forming apparatus according to claim 1, wherein the predetermined number of second background data is based on a length of a maximum change to be expected in the circumference of the rotation member and a length between the measurement positions.

9. An image forming apparatus that includes a rotation member used for image formation, forms a toner image on the rotation member, corrects a density of the toner image in accordance with background data of the rotation member, and obtains corrected density data, the image forming apparatus comprising:
a detection unit that irradiates a detection target with light and detects reflected light from the detection target;
a first obtaining unit that obtains background data at a first number of measurement positions including a given number of measurement positions on the rotation member based on a detection result of the detection unit by detecting reflected light from the rotation member, which is the detection target;
a second obtaining unit that obtains density data of a toner image at a second number of measurement positions lower in number than the first number of measurement positions based on a detection result of the detection unit by detecting reflected light from the toner image for adjusting an image density of an image formed on the rotation member; and
a calculating unit that
calculates a first correlation value that indicates a correlation between the density data in an obtaining result by the second obtaining unit and first background data of the second number of measurement positions corresponding to a reference position of measurement positions on the rotation member, which is assumed when a circumference of the rotation member is not changed from a reference circumference from among an obtaining result by the first obtaining unit, and
calculates a predetermined number of second correlation values that indicate a correlation between the density data in an obtaining result by the second obtaining unit and the predetermined number of second background data in the second number of measurement positions, each of which have been respectively shifted by a different number from the measurement positions of the first background data, from among the obtaining result by the first obtaining unit,
wherein there are a plurality of toner images, each having a mutually different color or density,
the calculating unit calculates the first correlation value and the second correlation value with respect to each of the plurality of toner images, totals the respective first correlation values of the plurality of toner images, and totals the predetermined number of second correlation values of the plurality of toner images,
the image forming apparatus further comprises a determination unit that determines which of the total value of the first correlation values and the total value of the second correlation values has a higher correlation, and
corrected density data is obtained in accordance with the first or second background data that is determined as having a higher correlation by the determination unit.

10. The image forming apparatus according to claim 9, wherein the predetermined number of second background data is based on a length of a maximum change to be expected in the circumference of the rotation member and a length between the measurement positions.

11. An image forming apparatus comprising:
a rotation member that is used for image formation;
a detection unit that irradiates the rotation member and detects reflected light;
a first obtaining unit that obtains background data at a first number of measurement positions including a given number of measurement positions on the rotation member based on a detection result of the detection unit by detecting reflected light from the rotation member, which is the detection target;
a second obtaining unit that obtains density data of a toner image a second number of measurement positions lower in number than the first number of measurement positions based on a detection result of the detection unit by detecting reflected light from the toner image for adjusting an image density of an image formed on the rotation member;
a calculating unit that,
normalizes the density data in an obtaining result by the second obtaining unit based on first background data of the second number of measurement positions corresponding to a reference position of measurement positions on the rotation member, which is assumed when a circumference of the rotation member is not changed from a reference circumference, from among the obtaining result by the first obtaining unit, and calculates first correction density data, and normalizes the density data in an obtaining result by the second obtaining unit based on second background data in the second number of measurement positions, each of which have been respectively shifted by a different number from the measurement positions of the first background data, from among the obtaining result by the first obtaining unit, and calculates a predetermined number of second correction density data, wherein a first value related to a variation between the plurality of density values included in each correction density data of the first correction density data and a second value related to a variation between the plurality of density values included in each correction density data of the second correction density data are compared, and an image forming condition is controlled based on the first correction density data or the predetermined number of the second correction density data based on which value related to its variation is smaller.

12. The image forming apparatus according to claim 11, wherein the predetermined number of the second background data is based on a length of a maximum change to be expected in the circumference of the rotation member and a length between the measurement positions.

13. An image forming apparatus comprising:
a rotation member that is used for image formation;
a detection unit that irradiates the rotation member and detects reflected light;
a first obtaining unit that obtains background data at a first number of measurement positions including a given number of measurement positions based on a detection result of the detection unit by detecting reflected light from the rotation member, which is the detection target;
a second obtaining unit that obtains density data of the toner image at a second number of measurement positions lower in number than the first number of measurement positions based on a detection result of the detection unit by detecting reflected light from the toner image for adjusting an image density of an image formed on the rotation member;

a calculating unit that calculates a first correlation value that indicates a correlation between the density data in an obtaining result by the second obtaining unit and first background data of the second number of measurement positions corresponding to a reference position of measurement positions on the rotation member, which is assumed if when a circumference of the rotation member is not changed from a reference circumference from among an obtaining result by the first obtaining unit, and calculates a predetermined number of second correlation values that indicate a correlation between the density data in an obtaining result by the second obtaining unit and the predetermined number of second background data in the second number of measurement positions, each of which have been respectively shifted by a different number from the measurement positions of the first background data, from among the obtaining result the first obtaining unit, wherein there are a plurality of toner images, each having a mutually different color or density, the calculating unit calculates the first correlation value and the second correlation value with respect to each of the plurality of toner images, totals the respective first correlation values of the plurality of toner images, and totals the predetermined number of second correlation values of the plurality of toner images, wherein a total value of the first correlation value and a total value of the second correlation value are compared, and an image forming condition is controlled based on a density data corrected in accordance with the background data corresponding to the first correlation value or the second correlation value based on which correlation value is higher.

14. The image forming apparatus according to claim 13, wherein the predetermined number of the second background data is based on a length of a maximum change to be expected in the circumference of the rotation member and a length between the measurement positions.

* * * * *